(12) United States Patent
Gou et al.

(10) Patent No.: US 12,127,244 B2
(45) Date of Patent: Oct. 22, 2024

(54) DATA PROCESSING METHOD, COMMUNICATION NODE, AND COMPUTER-READABLE STORAGE MEDIUM

(71) Applicant: ZTE Corporation, Guangdong (CN)

(72) Inventors: Wei Gou, Guangdong (CN); Peng Hao, Guangdong (CN); Xianghui Han, Guangdong (CN)

(73) Assignee: ZTE Corporation, Shenzhen (CN)

( * ) Notice: Subject to any disclaimer, the term of this patent is extended or adjusted under 35 U.S.C. 154(b) by 342 days.

(21) Appl. No.: 17/738,477

(22) Filed: May 6, 2022

(65) Prior Publication Data
US 2022/0330279 A1 Oct. 13, 2022

Related U.S. Application Data

(63) Continuation of application No. PCT/CN2020/127523, filed on Nov. 9, 2020.

(30) Foreign Application Priority Data

Nov. 8, 2019 (CN) .......................... 201911090295.5

(51) Int. Cl.
*H04W 72/12* (2023.01)
*H04L 1/18* (2023.01)
(Continued)

(52) U.S. Cl.
CPC ......... *H04W 72/569* (2023.01); *H04L 1/1812* (2013.01); *H04L 5/0053* (2013.01); *H04W 72/1263* (2013.01); *H04W 72/23* (2023.01)

(58) Field of Classification Search
CPC ......... H04W 72/1242; H04W 72/1263; H04W 72/289; H04W 72/569; H04W 72/23;
(Continued)

(56) References Cited

U.S. PATENT DOCUMENTS

| 8,320,319 B2 | 11/2012 | Lohr et al. |
| 11,870,584 B2 | 1/2024 | Park et al. |

(Continued)

FOREIGN PATENT DOCUMENTS

| CN | 103648169 A | 3/2014 |
| CN | 109474371 A | 3/2019 |

(Continued)

OTHER PUBLICATIONS

European Search Report issued in EP Patent Application No. 20885949.6, dated Oct. 12, 2023, 13 pages.
(Continued)

*Primary Examiner* — Rasheed Gidado
(74) *Attorney, Agent, or Firm* — Perkins Coie LLP

(57) ABSTRACT

Provided are a data processing method, a communication node and a computer-readable storage medium. The data processing method includes the following. A first communication node sends first control information to a second communication node, where the first control information is used for activating or deactivating at least one semi-persistent transmission, the first control information is associated with the first semi-persistent transmission, and the at least one semi-persistent transmission includes the first semi-persistent transmission.

16 Claims, 4 Drawing Sheets

A first communication node configures and sends second control information to a second communication node, where the second control information includes: information for indicating that a state of a secondary cell serving the second communication node converts; and the second control information further includes at least one of following pieces of information: information for indicating that the second control information is not used for scheduling user data, information for determining a hybrid automatic repeat request-acknowledgement (HARQ-ACK) information resource of the second control information, information for determining an interval timing from a slot where the second control information is located to a slot where HARQ-ACK of the second control information is located, information for determining an interval timing from a subslot where the second control information is located to a subslot where HARQ-ACK of the second control information is located, information for determining the location of HARQ-ACK of the second control information in a dynamic HARQ-ACK codebook, information of the priority of HARQ-ACK of the second control information, or information for determining the location of HARQ-ACK of the second control information in a semi-persistent HARQ-ACK codebook ⟶ S310

(51) Int. Cl.
*H04L 1/1812* (2023.01)
*H04L 5/00* (2006.01)
*H04W 72/1263* (2023.01)
*H04W 72/23* (2023.01)
*H04W 72/566* (2023.01)

(58) Field of Classification Search
CPC .. H04W 72/56; H04W 74/002; H04L 1/1812; H04L 1/1854; H04L 1/1861; H04L 1/1864; H04L 1/1887; H04L 1/1896; H04L 5/0053; H04L 5/0044; H04L 5/0055; H04L 5/0098
See application file for complete search history.

(56) References Cited

U.S. PATENT DOCUMENTS

| | | | |
|---|---|---|---|
| 11,953,555 | B2 | 4/2024 | Kanemaru et al. |
| 2018/0324773 | A1 | 11/2018 | Fu et al. |
| 2019/0028242 | A1 | 1/2019 | Xiao et al. |
| 2019/0124558 | A1 | 4/2019 | Ang et al. |
| 2019/0222349 | A1 | 7/2019 | Gao et al. |
| 2019/0327755 | A1 | 10/2019 | Xiong et al. |
| 2020/0228251 | A1* | 7/2020 | Yeo ........................ H04L 1/1822 |
| 2020/0313809 | A1* | 10/2020 | Park ...................... H04L 1/1861 |
| 2021/0006999 | A1* | 1/2021 | Takeda ................. H04L 5/0094 |
| 2022/0201725 | A1* | 6/2022 | Liu ....................... H04L 5/0053 |
| 2022/0256554 | A1* | 8/2022 | Chen ................ H04W 72/0446 |

FOREIGN PATENT DOCUMENTS

| | | |
|---|---|---|
| CN | 110149172 A | 8/2019 |
| CN | 111093276 A | 5/2020 |
| JP | 2022-526069 A | 5/2022 |
| WO | 2019082277 A1 | 5/2019 |
| WO | 2019083277 A1 | 5/2019 |
| WO | 2020197195 A1 | 10/2020 |
| WO | 2020204550 A1 | 10/2020 |

OTHER PUBLICATIONS

Spreadtrum Communications, "Discussion on DL SPS enhancements for URLLC," 3GPP TSG RAN WG1 #98bis, R1-1910021, Chongqing, China, Oct. 14-20, 2019, 4 pages.

NTT DOCOMO, Inc., "Discussions on DL SPS enhancement," 3GPP TSG RAN WG1 #98bis, R1-1911182, Chongqing, China, Oct. 14-20, 2019, 10 pages.

Samsung, "Discussion for enhancements for IIoT," 3GPP TSG RAN WG1 #98bis, R1-1910489, Chongqing, China, Oct. 14-20, 2019, 7 pages.

LG Electronics, "Other aspects for URLLC/IIoT," 3GPP TSG RAN WG1 #98bis, R1-1910832, Chongqing, China, Oct. 14-20, 2019, 3 pages.

Indian First Examination Report issued in IN Patent Application No. 202247027467, dated Feb. 20, 2024, 6 pages.

International Search Report and Written Opinion mailed on Feb. 8, 2021 for International Application No. PCT/CN2020/127523, filed on Nov. 9, 2020 (7 pages).

Asia Pacific Telecom, "Remaining issues on DL SPS enhancements," 3GPP TSG-RAN WG1 Meeting #100, R1-2000776, e-Meeting, Feb. 24-Mar. 6, 2020, 6 pages.

Huawei et al., "Low latency of SCell activation," 3GPP TSG RAN WG1 Meeting #96bis, R1-1903992, Xi'an, China, Apr. 8-12, 2019, 6 pages.

LG Electronics, "Summary#2 of 7.2.6.7 Others," 3GPP TSG RAN WG1 #98bis, R1-1911554, Chongqing, China, Oct. 14-20, 2019, 14 pages.

ZTE, "Other enhancements for Rel-16 URLLC," 3GPP TSG RAN WG1 #99, R1-1911969, Reno, USA, Nov. 18-22, 2019, 4 pages.

Taiwanese office action issued in TW Patent Application No. 109138918, dated Mar. 29, 2024, 20 pages. English machine translation included.

Nokia et al., "IIoT WI: Resource conflicts between UL grants, HARQ-ACK Enhancements for SPS and TSN time synchronization," 3GPP TSG RAN WG1 Meeting #98bis, R1-1910870, Chongqing, China, Oct. 14-20, 2019, 12 pages.

Taiwanese notice of allowance issued in TW Patent Application No. 109138918, dated May 31, 2024, 4 pages. English machine translation included.

Japanese office action issued in JP Patent Application No. 2022-526440, dated Aug. 13, 2024, 4 pages. English translation included.

Chinese office action issued in CN Patent Application No. 202210964750.5, dated Aug. 13, 2024, 24 pages. English translation included.

* cited by examiner

A first communication node sends first control information to a second communication node, where the first control information is used for activating or deactivating at least one semi-persistent transmission, the first control information is associated with the first semi-persistent transmission, and the at least one semi-persistent transmission includes the first semi-persistent transmission ~S110

FIG. 1

A second communication node receives first control information sent by a first communication node, where the first control information is used for activating or deactivating at least one semi-persistent transmission, the first control information is associated with the first semi-persistent transmission, and the at least one semi-persistent transmission includes the first semi-persistent transmission ~S210

FIG. 2

A first communication node configures and sends second control information to a second communication node, where the second control information includes: information for indicating that a state of a secondary cell serving the second communication node converts; and the second control information further includes at least one of following pieces of information: information for indicating that the second control information is not used for scheduling user data, information for determining a hybrid automatic repeat request-acknowledgement (HARQ-ACK) information resource of the second control information, information for determining an interval timing from a slot where the second control information is located to a slot where HARQ-ACK of the second control information is located, information for determining an interval timing from a subslot where the second control information is located to a subslot where HARQ-ACK of the second control information is located, information for determining the location of HARQ-ACK of the second control information in a dynamic HARQ-ACK codebook, information of the priority of HARQ-ACK of the second control information, or information for determining the location of HARQ-ACK of the second control information in a semi-persistent HARQ-ACK codebook ~S310

FIG. 3

A second communication node receives second control information sent by a first communication node, where the second control information includes: information for indicating that a state of a secondary cell serving the second communication node converts; and the second control information further includes at least one of following pieces of information: information for indicating that the second control information is not used for scheduling user data, information for determining a hybrid automatic repeat request-acknowledgement (HARQ-ACK) information resource of the second control information, information for determining an interval timing from a slot where the second control information is located to a slot where HARQ-ACK of the second control information is located, information for determining an interval timing from a subslot where the second control information is located to a subslot where HARQ-ACK of the second control information is located, information for determining the location of HARQ-ACK of the second control information in a dynamic HARQ-ACK codebook, information of the priority of HARQ-ACK of the second control information, or information for determining the location of HARQ-ACK of the second control information in a semi-persistent HARQ-ACK codebook ⟶ S410

FIG. 4

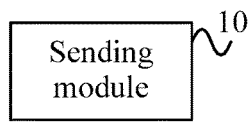

FIG. 5

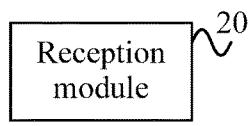

FIG. 6

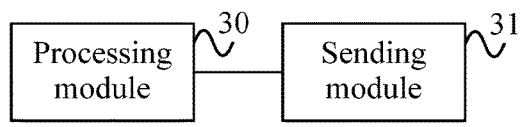

FIG. 7

DATA PROCESSING METHOD, COMMUNICATION NODE, AND COMPUTER-READABLE STORAGE MEDIUM

CROSS REFERENCE TO RELATED APPLICATIONS

This application is a continuation of and claims priority to International Patent Application No. PCT/CN2020/127523, filed on Nov. 9, 2020, which claims the benefit of priority to Chinese Patent Application No. 201911090295.5 filed with the China National Intellectual Property Administration (CNIPA) on Nov. 8, 2019. The entire contents of the before-mentioned patent applications are incorporated by reference as part of the disclosure of this application.

TECHNICAL FIELD

The present application relates to radio communication networks, for example, a data processing method, a communication node and a computer-readable storage medium.

BACKGROUND

In the New Radio (NR) Access Technology system, configuration of semi-persistent transmission for a terminal device is supported. The semi-persistent transmission can only be used after being activated by activation downlink control information (DCI) (a kind of specific dedicated DCI having a different design from the DCI for scheduling data). However, there is no detailed design rule for the activation DCI and the semi-persistent transmission.

SUMMARY

The present application provides a data processing method, a communication node and a computer-readable storage medium, so that the control information can be associated with the semi-persistent transmission, and the efficiency and stability of the transmission can be improved.

Embodiments of the present application provide a data processing method. The method includes the following.

A first communication node sends first control information to a second communication node, where the first control information is used for activating or deactivating at least one semi-persistent transmission, the first control information is associated with the first semi-persistent transmission, and the at least one semi-persistent transmission includes the first semi-persistent transmission.

The embodiments of the present application provide a data processing method. The method includes the following.

A second communication node receives first control information sent by a first communication node, where the first control information is used for activating or deactivating at least one semi-persistent transmission, the first control information is associated with the first semi-persistent transmission, and the at least one semi-persistent transmission includes the first semi-persistent transmission.

The embodiments of the present application provide a data processing method. The method includes the following.

A first communication node configures and sends second control information to a second communication node.

The second control information includes: information for indicating that a state of a secondary cell serving the second communication node converts; and the second control information further includes at least one of following pieces of information: information for indicating that the second control information is not used for scheduling user data, information for determining a hybrid automatic repeat request-acknowledgement (HARQ-ACK) information resource of the second control information, information for determining an interval timing from a slot where the second control information is located to a slot where HARQ-ACK of the second control information is located, information for determining an interval timing from a subslot where the second control information is located to a subslot where HARQ-ACK of the second control information is located, information for determining the location of HARQ-ACK of the second control information in a dynamic HARQ-ACK codebook, information of the priority of HARQ-ACK of the second control information, or information for determining the location of HARQ-ACK of the second control information in a semi-persistent HARQ-ACK codebook.

The embodiments of the present application provide a data processing method. The method includes the following.

A second communication node receives second control information sent by a first communication node.

The second control information includes: information for indicating that a state of a secondary cell serving the second communication node converts; and the second control information further includes at least one of following pieces of information: information for indicating that the second control information is not used for scheduling user data, information for determining a hybrid automatic repeat request-acknowledgement (HARQ-ACK) information resource of the second control information, information for determining an interval timing from a slot where the second control information is located to a slot where HARQ-ACK of the second control information is located, information for determining an interval timing from a subslot where the second control information is located to a subslot where HARQ-ACK of the second control information is located, information for determining the location of HARQ-ACK of the second control information in a dynamic HARQ-ACK codebook, information of the priority of HARQ-ACK of the second control information, or information for determining the location of HARQ-ACK of the second control information in a semi-persistent HARQ-ACK codebook.

The embodiments of the present application provide a communication node. The communication node includes a processor, which is configured to, when executing a computer program, implement the method of any one of the preceding embodiments.

The embodiments of the present application further provide a computer-readable storage medium configured to store a computer program which, when executed by a processor, implements the method of any one of the preceding embodiments.

BRIEF DESCRIPTION OF DRAWINGS

FIG. 1 is a flowchart of a data processing method according to an embodiment;

FIG. 2 is a flowchart of another data processing method according to an embodiment;

FIG. 3 is a flowchart of another data processing method according to an embodiment;

FIG. 4 is a flowchart of another data processing method according to an embodiment;

FIG. 5 is a structural diagram of a data processing apparatus according to an embodiment;

FIG. 6 is a structural diagram of another data processing apparatus according to an embodiment;

FIG. 7 is a structural diagram of another data processing apparatus according to an embodiment;

DETAILED DESCRIPTION

Figure 8:
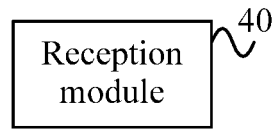
FIG. 8 is a structural diagram of another data processing apparatus according to an embodiment.

Embodiments of the present application are described hereinafter in detail in conjunction with drawings.

In the NR system, configuration of semi-persistent transmissions for a terminal device is supported. The semi-persistent transmission can only be used after being activated by activation downlink control information (DCI) (a kind of specific dedicated DCI having a different design from the DCI of scheduling data). For example, after the semi-persistent transmission is activated, semi-persistent transmission data may be received at a (periodic) location of the semi-persistent transmission, and a piece of semi-persistent release control signaling is supported to release at least two activated semi-persistent transmissions simultaneously. The semi-persistent transmission here may be a semi-persistent transmission of downlink data (also referred to as a semi-persistent scheduling physical downlink shared channel (SPS PDSCH)) or a semi-persistent transmission of uplink data (also referred to as a configured grant physical uplink shared channel (CG PUSCH)).

In the NR system, one activation DCI may activate a semi-persistent transmission. At the same time, the NR system further supports at least two transmissions having different priorities, such as a high-priority transmission and a low-priority transmission. For a semi-persistent transmission, it is supported to configure the terminal device with the semi-persistent transmission by radio resource control (RRC) signaling and use the RRC signaling for explicitly indicating the priority of the semi-persistent transmission, that is, a high priority or a low priority. In addition, the NR system further supports two hybrid automatic repeat request-acknowledgement (HARQ-ACK) information codebook transmissions having different priorities, for example, a high-priority HARQ-ACK codebook transmission and a low-priority HARQ-ACK codebook transmission, and HARQ-ACK transmissions having different priorities require different reliability and delays.

Therefore, four problems may exist when the activation DCI and the semi-persistent transmission are designed.

1. When one activation DCI activates at least two semi-persistent transmissions simultaneously, especially when the semi-persistent transmissions are configured with priorities by RRC signaling, what rules the activation DCI should follow to activate the at least two semi-persistent transmissions simultaneously?

2. If one deactivation DCI (the deactivation DCI is specific DCI used for deactivating an activated semi-persistent transmission and has a different design from the DCI of scheduling data) simultaneously deactivates at least two activated semi-persistent transmissions, how is the HARQ-ACK corresponding to the deactivation DCI fed back in an HARQ-ACK codebook (for example, when the HARQ-ACK codebook is a semi-persistent codebook, or when the HARQ-ACK codebook is a dynamic codebook)?

3. Since different semi-persistent transmissions have different priorities, how does one deactivation DCI deactivate at least two activation semi-persistent transmissions to make the corresponding subsequent HARQ-ACK codebook and feedback simple (for example, how to make the generation and transmission of the HARQ-ACK corresponding to the deactivation DCI simple? and for another example, how to determine the priority of the HARQ-ACK corresponding to the deactivation DCI?)?

4. When the deactivation DCI deactivates at least two activated semi-persistent transmissions (in particular, when the at least two semi-persistent transmissions simultaneously deactivated by the deactivation DCI are configured with different or the same priority by RRC signaling), how to determine the priority of the HARQ-ACK corresponding to the deactivation DCI?

The embodiments of the present application provide a mobile communication network (including but not limited to the 5th-generation (5G) mobile communication network). The network architecture of the network may include network-side devices (for example, one or more types of base stations, a transmission node, an access point (AP), a relay, a Node B (NB), Universal Terrestrial Radio Access (UTRA), Evolved Universal Terrestrial Radio Access (E-UTRA), etc.) and terminal devices (such as a user equipment (UE), a user equipment data card, a relay, a mobile device, etc.). In the embodiments of the present application, a data processing method, a communication node and a computer-readable storage medium which are operable on the preceding network architecture are provided, so that the control information can be associated with the semi-persistent transmission, and the efficiency and stability of the transmission can be improved.

FIG. 1 illustrates a flowchart of a data processing method according to an embodiment. As shown in FIG. 1, the method provided in this embodiment is applicable to a first communication node. The method includes the following.

In S110, a first communication node sends first control information to a second communication node, where the first control information is used for activating or deactivating at least one semi-persistent transmission, the first control information is associated with the first semi-persistent transmission, and the at least one semi-persistent transmission includes the first semi-persistent transmission.

In an embodiment, in a case where the first control information is used for deactivating at least two semi-persistent transmissions, and the at least two semi-persistent transmissions have the same priority, the location of HARQ-ACK of the first control information in a semi-persistent HARQ-ACK codebook is associated with a physical downlink shared channel (PDSCH) of the first semi-persistent transmission.

The index of the first semi-persistent transmission is the smallest among indexes of all deactivated semi-persistent transmissions; the index of the first semi-persistent transmission is the largest among indexes of all deactivated semi-persistent transmissions; or the first semi-persistent transmission is indicated by a piece of indication information carried by the first control information, where the piece of indication information is PDSCH time domain resource allocation information corresponding to the at least two deactivated semi-persistent transmissions, or the piece of indication information is an order index value after index values of the at least two deactivated semi-persistent transmissions are sorted in ascending order or descending order.

For example, the first control information is used for deactivating a semi-persistent transmission 1, a semi-persistent transmission 2 and a semi-persistent transmission 3, the index of the semi-persistent transmission 1 is 1, the index of the semi-persistent transmission 2 is 2, and the index of the semi-persistent transmission 3 is 3. Then, the first semi-persistent transmission may be the semi-persistent transmission 1 having the smallest index or the semi-persistent transmission 3 having the largest index, or the first semi-persistent transmission may also be indicated by a piece of indication information carried by the first control information.

In an embodiment, in a case where the first control information is used for deactivating at least two semi-persistent transmissions, and the at least two semi-persistent transmissions have different priorities, the location of HARQ-ACK of the first control information in a semi-persistent HARQ-ACK codebook is associated with a PDSCH of the first semi-persistent transmission.

The first semi-persistent transmission is a semi-persistent transmission having the highest priority among all deactivated semi-persistent transmissions; the first semi-persistent transmission is a semi-persistent transmission having the lowest priority among all deactivated semi-persistent transmissions; the first semi-persistent transmission is a semi-persistent transmission having the highest priority among all deactivated semi-persistent transmissions, and the index of the first semi-persistent transmission is the smallest among indexes of all deactivated semi-persistent transmissions having the highest priority; the first semi-persistent transmission is a semi-persistent transmission having the highest priority among all deactivated semi-persistent transmissions, and the index of the first semi-persistent transmission is the largest among indexes of all deactivated semi-persistent transmissions having the highest priority; the first semi-persistent transmission is a semi-persistent transmission having the lowest priority among all deactivated semi-persistent transmissions, and the index of the first semi-persistent transmission is the smallest among indexes of all deactivated semi-persistent transmissions having the highest priority; or the first semi-persistent transmission is a semi-persistent transmission having the lowest priority among all deactivated semi-persistent transmissions, and the index of the first semi-persistent transmission is the largest among indexes of all deactivated semi-persistent transmissions having the highest priority.

In an embodiment, in a case where at least two semi-persistent transmissions have different priorities, the first communication node configures the index value of a high-priority semi-persistent transmission to be smaller than the index value of a low-priority semi-persistent transmission, or the first communication node configures the index value of a high-priority semi-persistent transmission to be larger than the index value of a low-priority semi-persistent transmission.

In an embodiment, in a case where the first control information is used for deactivating at least two semi-persistent transmissions, the priority of HARQ-ACK of the first control information is determined in one of manners described below.

The priority of the HARQ-ACK of the first control information is determined according to priority indication information carried by the first control information.

The priority of the HARQ-ACK of the first control information is determined according to the priority of a semi-persistent transmission having the highest priority configured by radio resource control (RRC) signaling of the at least two deactivated semi-persistent transmissions.

The priority of the HARQ-ACK of the first control information is determined according to a relatively high priority of priority indication information carried by the first control information and priorities configured by RRC signaling of the at least two deactivated semi-persistent transmissions, where in a case where the first control information does not carry the priority indication information, the priority indication information carried by the first control information is determined as a low priority.

In a case where the first control information carries priority indication information, the priority of the HARQ-ACK of the first control information is determined according to the priority indication information carried by the first control information; otherwise, in response to the at least two deactivated semi-persistent transmissions being configured with priorities by RRC signaling, the priority of the HARQ-ACK of the first control information is determined according to a high priority of the priorities configured by the RRC signaling of the at least two deactivated semi-persistent transmissions; or otherwise, the HARQ-ACK of the first control information is determined as a low priority.

In a case where the at least two deactivated semi-persistent transmissions is configured with priorities by RRC signaling, the priority of the HARQ-ACK of the first control information is determined according to a high priority of the priorities configured by the RRC signaling of the at least two deactivated semi-persistent transmissions; or otherwise, the HARQ-ACK of the first control information is determined as a low priority.

In a case where a semi-persistent transmission is not configured with a priority by RRC signaling, it is determined that the semi-persistent transmission is configured with a low priority by the RRC signaling.

In an embodiment, in a case where the first control information is used for activating at least two semi-persistent transmissions, and the at least two semi-persistent transmissions have different priorities, priority indication information carried by the first control information is valid and is applicable to the at least two semi-persistent transmissions.

In a case where the first control information is used for activating at least two semi-persistent transmissions, and the at least two semi-persistent transmissions have different priorities, priority indication information carried by the first control information is invalid and is not applicable to the at least two semi-persistent transmissions.

In a case where the first control information is used for activating at least two semi-persistent transmissions, and a semi-persistent transmission not configured with a priority by RRC signaling exists in the at least two semi-persistent transmissions, the priority of the semi-persistent transmission not configured with the priority by the RRC signaling is determined according to priority indication information carried by the first control information.

In a case where the first control information is used for activating at least two semi-persistent transmissions, and the at least two semi-persistent transmissions are required to have the same priority configured by RRC signaling, the priority indicated by priority indication information carried by the first control information is allowed to follow or modify the priority configured by the RRC signaling of the at least two semi-persistent transmissions.

In an embodiment, in a case where the first control information is used for activating one semi-persistent transmission, and the one semi-persistent transmission is configured with a priority by RRC signaling, in response to the first control information not carrying priority indication information, the priority of the one semi-persistent transmission is determined according to the priority configured by the RRC signaling.

In a case where the first control information is used for activating one semi-persistent transmission, and the one semi-persistent transmission is not configured with a priority by RRC signaling, in response to the first control information not carrying priority indication information, the priority of the one semi-persistent transmission is determined according to a high priority or a low priority.

In a case where the first control information is used for activating one semi-persistent transmission, and the one semi-persistent transmission is configured with a priority by RRC signaling, in response to the first control information carrying priority indication information, the priority of the one semi-persistent transmission is determined according to the priority indication information carried by the first control information.

In a case where the first control information is used for activating one semi-persistent transmission, and the one semi-persistent transmission is not configured with a priority by RRC signaling, in response to the first control information carrying priority indication information, the priority of the one semi-persistent transmission is determined according to the priority indication information carried by the first control information.

In a case where the first control information is used for activating one semi-persistent transmission, and the one semi-persistent transmission is configured with a priority by RRC signaling, in response to the first control information carrying priority indication information, the priority of the one semi-persistent transmission is determined according to a relatively high priority or a relatively low priority of the priority indication information carried by the first control information and the priority configured by the RRC signaling.

In an embodiment, in a case where the first control information is used for deactivating one semi-persistent transmission, and the one semi-persistent transmission is configured with a priority by RRC signaling, in response to the first control information not carrying priority indication information, the priority of the one semi-persistent transmission is determined according to the priority configured by the RRC signaling.

In a case where the first control information is used for deactivating one semi-persistent transmission, and the one semi-persistent transmission is not configured with a priority by RRC signaling, in response to the first control information not carrying priority indication information, the priority of the one semi-persistent transmission is determined according to a high priority or a low priority.

In a case where the first control information is used for deactivating one semi-persistent transmission, and the one semi-persistent transmission is configured with a priority by RRC signaling, in response to the first control information carrying priority indication information, the priority of the one semi-persistent transmission is determined according to the priority indication information carried by the first control information.

In a case where the first control information is used for deactivating one semi-persistent transmission, and the one semi-persistent transmission is not configured with a priority by RRC signaling, in response to the first control information carrying priority indication information, the priority of the one semi-persistent transmission is determined according to the priority indication information carried by the first control information.

In a case where the first control information is used for deactivating one semi-persistent transmission, and the one semi-persistent transmission is configured with a priority by RRC signaling, in response to the first control information carrying priority indication information, the priority of the one semi-persistent transmission is determined according to a relatively high priority or a relatively low priority of the priority indication information carried by the first control information and the priority configured by the RRC signaling.

FIG. 2 illustrates a flowchart of another data processing method according to an embodiment. As shown in FIG. 2, the method provided in this embodiment is applicable to a second communication node. The method includes the following.

In S210, a second communication node receives first control information sent by a first communication node, where the first control information is used for activating or deactivating at least one semi-persistent transmission, the first control information is associated with the first semi-persistent transmission, and the at least one semi-persistent transmission includes the first semi-persistent transmission.

In an embodiment, in a case where the first control information is used for deactivating at least two semi-persistent transmissions, and the at least two semi-persistent transmissions have the same priority, the location of hybrid automatic repeat request-acknowledgement (HARQ-ACK) information of the first control information in a semi-persistent HARQ-ACK codebook is associated with a physical downlink shared channel (PDSCH) of the first semi-persistent transmission.

The index of the first semi-persistent transmission is the smallest among indexes of all deactivated semi-persistent transmissions; the index of the first semi-persistent transmission is the largest among indexes of all deactivated semi-persistent transmissions; or the first semi-persistent transmission is indicated by a piece of indication information carried by the first control information, where the piece of indication information is PDSCH time domain resource allocation information corresponding to the at least two deactivated semi-persistent transmissions, or the piece of indication information is an order index value after index values of the at least two deactivated semi-persistent transmissions are sorted in ascending order or descending order.

For example, the first control information is used for deactivating a semi-persistent transmission 1, a semi-persistent transmission 2 and a semi-persistent transmission 3, the index of the semi-persistent transmission 1 is 1, the index of the semi-persistent transmission 2 is 2, and the index of the semi-persistent transmission 3 is 3. Then, the first semi-persistent transmission may be the semi-persistent transmission 1 having the smallest index or the semi-persistent transmission 3 having the largest index, and the first semi-persistent transmission may also be indicated by a piece of indication information carried by the first control information.

In an embodiment, in a case where the first control information is used for deactivating at least two semi-persistent transmissions, and the at least two semi-persistent transmissions have different priorities, the location of HARQ-ACK of the first control information in a semi-persistent HARQ-ACK codebook is associated with a PDSCH of the first semi-persistent transmission.

The first semi-persistent transmission is a semi-persistent transmission having the highest priority among all deactivated semi-persistent transmissions; the first semi-persistent transmission is a semi-persistent transmission having the lowest priority among all deactivated semi-persistent transmissions; the first semi-persistent transmission is a semi-persistent transmission having the highest priority among all deactivated semi-persistent transmissions, and the index of the first semi-persistent transmission is the smallest among indexes of all deactivated semi-persistent transmissions having the highest priority; the first semi-persistent transmission is a semi-persistent transmission having the highest priority among all deactivated semi-persistent transmissions, and the index of the first semi-persistent transmission is the largest among indexes of all deactivated semi-persistent transmissions having the highest priority; the first semi-persistent transmission is a semi-persistent transmission having the lowest priority among all deactivated semi-persistent transmissions, and the index of the first semi-persistent transmission is the smallest among indexes of all deactivated semi-persistent transmissions having the highest priority; or the first semi-persistent transmission is a semi-persistent transmission having the lowest priority among all deactivated semi-persistent transmissions, and the index of the first semi-persistent transmission is the largest among indexes of all deactivated semi-persistent transmissions having the highest priority.

In an embodiment, in a case where at least two semi-persistent transmissions have different priorities, the index value of a high-priority semi-persistent transmission is smaller than the index value of a low-priority semi-persistent transmission, or the index value of a high-priority semi-persistent transmission is larger than the index value of a low-priority semi-persistent transmission.

In an embodiment, in a case where the first control information is used for deactivating at least two semi-persistent transmissions, the priority of HARQ-ACK of the first control information is determined in one of manners described below.

The priority of the HARQ-ACK of the first control information is determined according to priority indication information carried by the first control information.

The priority of the HARQ-ACK of the first control information is determined according to the priority of a semi-persistent transmission having the highest priority configured by radio resource control (RRC) signaling of the at least two deactivated semi-persistent transmissions.

The priority of the HARQ-ACK of the first control information is determined according to a relatively high priority of priority indication information carried by the first control information and priorities configured by RRC signaling of the at least two deactivated semi-persistent transmissions, where in a case where the first control information does not carry the priority indication information, the priority indication information carried by the first control information is determined as a low priority.

In a case where the first control information carries priority indication information, the priority of the HARQ-ACK of the first control information is determined according to the priority indication information carried by the first control information; otherwise, in response to the at least two deactivated semi-persistent transmissions being configured with priorities by RRC signaling, the priority of the HARQ-ACK of the first control information is determined according to a high priority of the priorities configured by the RRC signaling of the at least two deactivated semi-persistent transmissions; or otherwise, the HARQ-ACK of the first control information is determined as a low priority.

In a case where the at least two deactivated semi-persistent transmissions is configured with priorities by RRC signaling, the priority of the HARQ-ACK of the first control information is determined according to a high priority of the priorities configured by the RRC signaling of the at least two deactivated semi-persistent transmissions; or otherwise, the HARQ-ACK of the first control information is determined as a low priority.

In a case where a semi-persistent transmission is not configured with a priority by RRC signaling, it is determined that the semi-persistent transmission is configured with a low priority by the RRC signaling.

In an embodiment, in a case where the first control information is used for activating at least two semi-persistent transmissions, and the at least two semi-persistent transmissions have different priorities, priority indication information carried by the first control information is valid and is applicable to the at least two semi-persistent transmissions.

In a case where the first control information is used for activating at least two semi-persistent transmissions, and the at least two semi-persistent transmissions have different priorities, priority indication information carried by the first control information is invalid and is not applicable to the at least two semi-persistent transmissions.

In a case where the first control information is used for activating at least two semi-persistent transmissions, and a semi-persistent transmission not configured with a priority by RRC signaling exists in the at least two semi-persistent transmissions, the priority of the semi-persistent transmission not configured with the priority by the RRC signaling is determined according to priority indication information carried by the first control information.

In a case where the first control information is used for activating at least two semi-persistent transmissions, and the at least two semi-persistent transmissions are required to have the same priority configured by RRC signaling, the priority indicated by priority indication information carried by the first control information is allowed to follow or modify the priority configured by the RRC signaling of the at least two semi-persistent transmissions.

In an embodiment, in a case where the first control information is used for activating one semi-persistent transmission, and the one semi-persistent transmission is configured with a priority by RRC signaling, in response to the first control information not carrying priority indication information, the priority of the one semi-persistent transmission is determined according to the priority configured by the RRC signaling.

In a case where the first control information is used for activating one semi-persistent transmission, and the one semi-persistent transmission is not configured with a priority by RRC signaling, in response to the first control information not carrying priority indication information, the priority of the one semi-persistent transmission is determined according to a high priority or a low priority.

In a case where the first control information is used for activating one semi-persistent transmission, and the one semi-persistent transmission is configured with a priority by RRC signaling, in response to the first control information carrying priority indication information, the priority of the one semi-persistent transmission is determined according to the priority indication information carried by the first control information.

In a case where the first control information is used for activating one semi-persistent transmission, and the one semi-persistent transmission is not configured with a priority by RRC signaling, in response to the first control information carrying priority indication information, the priority of the one semi-persistent transmission is determined according to the priority indication information carried by the first control information.

In a case where the first control information is used for activating one semi-persistent transmission, and the one semi-persistent transmission is configured with a priority by RRC signaling, in response to the first control information carrying priority indication information, the priority of the one semi-persistent transmission is determined according to a relatively high priority or a relatively low priority of the priority indication information carried by the first control information and the priority configured by the RRC signaling.

In an embodiment, in a case where the first control information is used for deactivating one semi-persistent transmission, and the one semi-persistent transmission is configured with a priority by RRC signaling, in response to the first control information not carrying priority indication information, the priority of the one semi-persistent transmission is determined according to the priority configured by the RRC signaling.

In a case where the first control information is used for deactivating one semi-persistent transmission, and the one semi-persistent transmission is not configured with a priority by RRC signaling, in response to the first control information not carrying priority indication information, the priority of the one semi-persistent transmission is determined according to a high priority or a low priority.

In a case where the first control information is used for deactivating one semi-persistent transmission, and the one semi-persistent transmission is configured with a priority by RRC signaling, in response to the first control information carrying priority indication information, the priority of the one semi-persistent transmission is determined according to the priority indication information carried by the first control information.

In a case where the first control information is used for deactivating one semi-persistent transmission, and the one semi-persistent transmission is not configured with a priority by RRC signaling, in response to the first control information carrying priority indication information, the priority of the one semi-persistent transmission is determined according to the priority indication information carried by the first control information.

In a case where the first control information is used for deactivating one semi-persistent transmission, and the one semi-persistent transmission is configured with a priority by RRC signaling, in response to the first control information carrying priority indication information, the priority of the one semi-persistent transmission is determined according to a relatively high priority or a relatively low priority of the priority indication information carried by the first control information and the priority configured by the RRC signaling.

Some example implementations are listed below to explain the data processing method provided in FIG. 1 or FIG. 2 of the embodiments of the present application. The example implementations described below may be executed alone or in combination with each other, which is not specifically limited in the embodiments of the present application. The activation DCI or deactivation DCI in the example embodiments described below corresponds to the preceding first control information.

In the first example embodiment, if deactivation DCI deactivates at least two semi-persistent transmissions simultaneously, and the at least two semi-persistent transmissions are configured with the same priority by RRC signaling, HARQ-ACK of the deactivation DCI is associated with a PDSCH of a semi-persistent transmission having the smallest index or the largest index of the at least two semi-persistent transmissions. That is, the location of the HARQ-ACK of the deactivation DCI in a semi-persistent HARQ-ACK codebook is the same as a receiving location of the PDSCH of the semi-persistent transmission having the smallest index or the largest index among the at least two deactivated semi-persistent transmissions.

For example, the deactivation DCI deactivates four semi-persistent transmissions simultaneously, and indexes of the four semi-persistent transmissions are 1, 2, 3, and 4 in order. The indexes respectively have corresponding PDSCHs of the semi-persistent transmissions. At this time, the location of the HARQ-ACK of the deactivation DCI in the semi-persistent HARQ-ACK codebook is the same as the receiving location of the PDSCH of the semi-persistent transmission having the index 1 (the smallest index). That is, the location of the HARQ-ACK of the deactivation DCI in the semi-persistent HARQ-ACK codebook is determined according to the receiving location of the PDSCH, that is, the location of HARQ-ACK corresponding to the receiving place of the PDSCH (the location of the PDSCH) in the semi-persistent HARQ-ACK codebook is taken as the location of the HARQ-ACK of the deactivation DCI in the semi-persistent codebook. The location of the PDSCH is actually not used for transmitting downlink data, and the HARQ-ACK of the deactivation DCI is actually at the location of the HARQ-ACK corresponding to the location of the PDSCH. In the at least two deactivated semi-persistent transmissions, the PDSCH of the semi-persistent transmission not associated with the HARQ-ACK of the deactivation DCI may be used for scheduling downlink data transmissions.

In this manner, when deactivating the at least two semi-persistent transmissions, the deactivation DCI may only be associated with the receiving location of the PDSCH of one semi-persistent transmission, so that the PDSCH of the semi-persistent transmission that is not selected can be used for scheduling downlink data, thereby saving PDSCH resources.

In the second example embodiment, based on the first example embodiment, when the at least two deactivated semi-persistent transmissions are configured with different priorities by the RRC signaling, the HARQ-ACK of the deactivation DCI is associated with the PDSCH of the semi-persistent transmission having the highest priority or the lowest priority of the at least two semi-persistent transmissions. If at least two semi-persistent transmissions having the highest priority or the lowest priority exist, the PDSCH of the semi-persistent transmission having the smallest index or the largest index is selected for association. That is, the location of the HARQ-ACK of the deactivation DCI in the semi-persistent HARQ-ACK codebook is the same as the receiving location of the PDSCH of the semi-persistent transmission having the highest priority or the lowest priority of the at least two deactivated semi-persistent transmissions. If at least two semi-persistent transmissions having the highest priority or the lowest priority still exist, a semi-persistent transmission having the same receiving location of the PDSCH as the semi-persistent transmission having the smallest index or the largest index is selected from the semi-persistent transmissions having the highest priority or the lowest priority.

It is to be noted that if the receiving location of the PDSCH of the semi-persistent transmission having the highest priority is selected to be associated with the HARQ-ACK of the deactivation DCI, the HARQ-ACK of the deactivation DCI can be avoided from being dropped. For example, if the transmission of the HARQ-ACK of the deactivation DCI has a time domain collision with the transmission of the information of another priority, the high-priority HARQ-ACK can be ensured to be transmitted.

For example, the deactivation DCI deactivates four semi-persistent transmissions simultaneously, and indexes of the four semi-persistent transmissions are 1, 2, 3 and 4 in order. The priority of the index 1 is high, the priority of the index 2 is low, the priority of the index 3 is high, and the priority of the index 4 is low. The indexes respectively have corresponding PDSCHs of the semi-persistent transmissions. At this time, the location of the HARQ-ACK of the deactivation DCI in the semi-persistent HARQ-ACK codebook is the same as the receiving location of the PDSCH of the semi-persistent transmission having the highest priority. At this time, the index 1 and the index 3 are selected, and then the semi-persistent transmission having the same receiving location of the PDSCH as the semi-persistent transmission having the index 1, that is, the smallest index, is selected. That is, the location of the HARQ-ACK of the deactivation DCI in the semi-persistent HARQ-ACK codebook is determined according to the receiving location of the PDSCH, that is, the location of HARQ-ACK corresponding to the receiving place of the PDSCH (the location of the PDSCH) in the semi-persistent HARQ-ACK codebook is taken as the location of the HARQ-ACK of the deactivation DCI in the semi-persistent codebook. The location of the PDSCH is actually not used for transmitting downlink data, and the location of the HARQ-ACK corresponding to the location of the PDSCH is actually the HARQ-ACK of the deactivation DCI.

In this manner, in addition to the benefits of the first example embodiment, it may be ensured that the HARQ-ACK of the deactivation DCI has a high priority to avoid being dropped when a transmission collision occurs.

In the third example embodiment, in both the first and second example embodiments, the HARQ-ACK of the deactivation DCI is associated with the receiving location of the PDSCH of a semi-persistent transmission, and the semi-persistent transmission is determined by using agreed rules.

For the third example embodiment, a flexible manner to determine a semi-persistent transmission is provided as described below.

A base station indicates one semi-persistent transmission in the manner that the deactivation DCI carries a piece of indication information. The location of the HARQ-ACK of the deactivation DCI in the semi-persistent HARQ-ACK codebook is associated with the PDSCH of the one semi-persistent transmission indicated by the deactivation DCI. Here, the one semi-persistent transmission is one of the at least two semi-persistent transmissions deactivated by the deactivation DCI. Specifically, the base station indicates PDSCH time domain resource allocation of the one semi-persistent transmission in the manner that the deactivation DCI carries the piece of indication information, which may specifically include one of methods described below. In method 1, a time domain resource allocation domain in the deactivation DCI is used for indicating one semi-persistent transmission from deactivated semi-persistent transmissions, and time domain resource allocation of the deactivated semi-persistent transmissions is used. In method 2, a time domain resource allocation domain in the deactivation DCI is used for indicating one semi-persistent transmission from deactivated semi-persistent transmissions, and indexes of the deactivated semi-persistent transmissions are used. In method 3, a time domain resource allocation domain in the deactivation DCI is used for indicating one semi-persistent transmission from deactivated semi-persistent transmissions, and an order index value of the deactivated semi-persistent transmissions are used. For example, after indexes of at least two deactivated semi-persistent transmissions are sorted in ascending order or descending order, one semi-persistent transmission is described according to an order index value after the sorting in ascending order or descending order (for example, after the at least two semi-persistent transmissions are in ascending order according to indexes, which semi-persistent transmission is selected is described).

In this manner, the HARQ-ACK of the deactivation DCI can be dynamically associated with the PDSCH of one semi-persistent transmission to be applicable to the transmission of the dynamically scheduled PDSCH. For example, four deactivated semi-persistent transmissions exist, and the base station wants to use the PDSCH of the semi-persistent transmission having the smallest index thereof for the transmission of dynamically scheduled data, but according to the first and second example embodiments, the PDSCH of the semi-persistent transmission having the smallest index is associated with the HARQ-ACK of the deactivation DCI, resulting in that the base station cannot use the PDSCH of the semi-persistent transmission having the smallest index to transmit the dynamically scheduled data. However, in the third example embodiment, the base station may dynamically indicate that the HARQ-ACK of the deactivation DCI is associated with the PDSCH of another semi-persistent transmission, thereby ensuring that the base station transmits the dynamically scheduled data by using the PDSCH of the semi-persistent transmission having the smallest index. For the preceding method 1, since the PDSCH time domain resource allocation domain in the deactivation DCI is not used in the related art, reuse is suggested. Method 2 and method 3 have the effect of reducing signaling overhead with respect to method 1, since the total number of configured semi-persistent transmissions is less than or equal to the total number of allocated time domain resources. Method 3 has less signaling overhead than method 2, since the number of deactivated semi-persistent transmissions is less than or equal to the number of configured semi-persistent transmissions.

In the fourth example embodiment, the base station and a UE agree on that when the RRC signaling configures at least two semi-persistent transmissions for the UE, the index value configured for a high-priority semi-persistent transmission is smaller than the index value configured for a low-priority semi-persistent transmission. Thus, it is equivalent to that when the RRC signaling configures an index for a semi-persistent transmission, the RRC signaling gives a priority to the index, and the priority of the index corresponds to the priority of the semi-persistent transmission. For example, four semi-persistent transmissions are configured for the UE, and two semi-persistent transmissions have high priorities and the other two semi-persistent transmissions have low priorities. Indexes of the two high-priority semi-persistent transmissions are configured as 1 and 2 respectively, and indexes of the two low-priority semi-persistent transmissions are configured as 3 and 4 respectively, or the indexes of the two low-priority semi-persistent transmissions may also be 5 and 6 respectively (as long as larger than the index values of the two high-priority semi-persistent transmissions).

Alternatively, the base station and the UE agree on that when the UE is configured with at least two semi-persistent transmissions, the index value configured for a high-priority semi-persistent transmission is larger than the index value configured for a low-priority semi-persistent transmission.

Thus, if the at least two deactivated semi-persistent transmissions have different priorities configured by the RRC signaling, when a semi-persistent transmission associated with the HARQ-ACK of the deactivation DCI is determined, it is ensured that the HARQ-ACK of the deactivation DCI has a high priority as long as the execution according to the first example embodiment is followed.

In the fifth example embodiment, the base station and the UE agree on that if the deactivation DCI deactivates at least two semi-persistent transmissions simultaneously, and the at least two semi-persistent transmissions are configured with different priorities by the RRC signaling, the priority of the HARQ-ACK of the deactivation DCI is determined as at least one of the following.

The priority of the HARQ-ACK of the deactivation DCI is determined as the priority indicated by priority indication information carried by the deactivation DCI (or activation DCI). In this manner, a flexible HARQ-ACK priority can be provided for the deactivation DCI regardless of whether the at least two deactivated semi-persistent transmissions are configured with priorities by the RRC.

Alternatively, the priority of the HARQ-ACK of the deactivation DCI is determined according to the priority of a semi-persistent transmission having the highest priority (or the lowest priority) configured by the RRC signaling among the at least two deactivated semi-persistent transmissions. In this manner, regardless of whether the deactivation DCI carries the priority indication information, it can be ensured that the deactivation DCI has a high priority of the HARQ-ACK to prevent the HARQ-ACK from being dropped when a transmission collision occurs. If the at least two deactivated semi-persistent transmissions are not configured with priorities by the RRC signaling, the priority of the HARQ-ACK of the deactivation DCI is determined as a low priority (or a high priority).

Alternatively, if the deactivation DCI carries priority indication information, and the at least two deactivated semi-persistent transmissions are not configured with priorities by the RRC signaling, the priority of the HARQ-ACK of the deactivation DCI is determined according to the priority indication information carried by the deactivation DCI.

Alternatively, if the deactivation DCI carries priority indication information, and the at least two deactivated semi-persistent transmissions are configured with priorities by the RRC signaling, the priority of the HARQ-ACK of the deactivation DCI is determined according to the priority indication information carried by the deactivation DCI.

Alternatively, if the deactivation DCI does not carry priority indication information, and the at least two deactivated semi-persistent transmissions are configured with priorities by the RRC signaling, the priority of the HARQ-ACK of the deactivation DCI is determined as the priority of the semi-persistent transmission having the highest priority (or the lowest priority) configured by the RRC signaling of the at least two deactivated semi-persistent transmissions.

Alternatively, if the deactivation DCI does not carry priority indication information, and the at least two deactivated semi-persistent transmissions are not configured with priorities by the RRC signaling, the priority of the HARQ-ACK of the deactivation DCI is determined as a low priority (or a high priority).

Alternatively, if the deactivation DCI carries priority indication information, and the at least two deactivated semi-persistent transmissions are configured with priorities by the RRC signaling, the priority of the HARQ-ACK of the deactivation DCI is determined according to a relatively high priority (or a relatively low priority) of the priority carried by the deactivation DCI and the priorities configured by the RRC signaling of the at least two semi-persistent transmissions.

The preceding determination rules may be used in combination. For example, when the deactivation DCI deactivates at least two semi-persistent transmissions simultaneously, if the deactivation DCI carries the priority indication information (whether the RRC signaling configures priorities for the at least two semi-persistent transmissions or not), the priority of the HARQ-ACK of the deactivation DCI is determined according to the priority carried by the deactivation DCI; otherwise, the at least two deactivated semi-persistent transmissions are configured with priorities by the RRC signaling, the priority of the HARQ-ACK of the deactivation DCI is determined according to a high priority (or a low priority) of the priorities configured by the RRC signaling of the at least two deactivated semi-persistent transmissions; or otherwise, the priority of the HARQ-ACK of the deactivation DCI is low-priority (or high-priority).

For another example, if the at least two deactivated semi-persistent transmissions are configured with priorities by the RRC signaling (regardless of whether the deactivation DCI carries priority indication information), the priority of the HARQ-ACK of the deactivation DCI is determined according to a high priority (or a low priority) of the priorities configured by the RRC signaling of the at least two deactivated semi-persistent transmissions; or otherwise, the priority of the HARQ-ACK of the deactivation DCI is low-priority (or high-priority).

For another example, the priority of the HARQ-ACK of the deactivation DCI is determined as a relatively high priority of the priority indication carried by the deactivation DCI and the priorities configured by the RRC signaling of the at least two deactivated semi-persistent transmission (if the priority indicated by the priority indication and the priorities are the same priority, the same priority is used). Here, if the deactivation DCI does not carry the priority indication, the priority indication carried by the deactivation DCI is determined to have a low priority. The semi-persistent transmission not configured with a priority by the RRC signaling is determined as a semi-persistent transmission having a low priority.

In addition, in a case where the deactivation DCI deactivates a semi-persistent transmission, the priority of the HARQ-ACK of the deactivation DCI is determined in at least one of manners described below.

In processing 1, for the priority of the HARQ-ACK (that is, whether the HARQ-ACK belongs to a high-priority or low-priority HARQ-ACK codebook) of the deactivation DCI for a semi-persistent transmission and the semi-persistent transmission being configured with a priority by the RRC, if the deactivation DCI does not carry priority indication information during the deactivation, the priority of the HARQ-ACK of the deactivation DCI is determined as the priority configured by the RRC of the semi-persistent transmission.

In processing 2, for the priority of the HARQ-ACK of the deactivation DCI for a semi-persistent transmission and the semi-persistent transmission not being configured with a priority by the RRC, if the deactivation DCI does not carry priority indication information during the deactivation, the HARQ-ACK of the deactivation DCI is determined to have a low priority (or a high priority).

In processing 3, for the priority of the HARQ-ACK of the deactivation DCI for a semi-persistent transmission and the semi-persistent transmission being configured with a priority by the RRC, if the deactivation DCI carries priority indication information during the deactivation, the priority of the HARQ-ACK of the deactivation DCI is determined according to the priority indication carried by the deactivation DCI.

In processing 4, for the priority of the HARQ-ACK of the deactivation DCI for a semi-persistent transmission and the semi-persistent transmission not being configured with a priority by the RRC, if the deactivation DCI carries priority indication information during the deactivation, the priority of the HARQ-ACK of the deactivation DCI is determined according to the priority indication carried by the deactivation DCI.

In processing 5, for the priority of the HARQ-ACK of the deactivation DCI for a semi-persistent transmission and the semi-persistent transmission being configured with a priority by the RRC, if the deactivation DCI carries priority indication information during the deactivation, but the priority indication information is invalid, the priority of the HARQ-ACK of the deactivation DCI is determined according to the priority configured by the RRC of the semi-persistent transmission.

In processing 6, for the priority of the HARQ-ACK of the deactivation DCI for a semi-persistent transmission and the semi-persistent transmission not being configured with a priority by the RRC, if the deactivation DCI carries priority indication information during the deactivation, but the priority indication information is invalid, the HARQ-ACK of the deactivation DCI is determined to have a low priority (or a high priority).

In processing 7, for the priority of the HARQ-ACK of the deactivation DCI for a semi-persistent transmission and the semi-persistent transmission being configured with a priority by the RRC, if the deactivation DCI carries priority indication information during the deactivation, the priority of the HARQ-ACK of the deactivation DCI is determined as a relatively high priority (or a relatively low priority) of the priority carried by the deactivation DCI and the priority configured by the RRC.

The preceding processing may be in combination with each other.

In the sixth example embodiment, when the base station configures a semi-persistent transmission with a priority, for example, a high priority or a low priority, by high level signaling, that is, the RRC signaling, and when activation downlink control signaling (activation DCI, used for activating a semi-persistent transmission for the UE) carries a piece of priority indication information (for example, a high priority or a low priority), the base station and the UE agree to use any of manners described below for processing.

In manner 1, if one activation DCI activates priorities of at least two semi-persistent transmissions simultaneously, and the at least two activated semi-persistent transmissions are configured with different priorities by the RRC signaling, the priority indication information carried by the activation DCI is valid at this time (the respective priorities configured by the RRC signaling of the at least two activated semi-persistent transmissions become invalid). For example, if the priority indication information indicates a high priority, the at least two activated semi-persistent transmissions at this time are both determined as the high priority according to the priority indication information carried by the activation DCI.

With manner 1, the problem can be effectively solved of requiring at least two semi-persistent transmission resources having the same priority for the semi-persistent transmission. For example, the base station or the UE needs four semi-persistent transmissions having the same priority to be activated, but four semi-persistent transmissions are configured currently and are configured with different priorities. At this time, manner 1 may be used for activating the four semi-persistent transmissions simultaneously, and the priority in the priority indication information carried by the activation DCI is applied to the four activated semi-persistent transmissions, so as to satisfy the requirements of the base station or the UE. According to the related mechanism, the RRC signaling needs to be used for re-configuring the priorities of the four semi-persistent transmissions to make the priorities of the four semi-persistent transmissions the same, and the four semi-persistent transmissions are activated one by one by using the activation DCI. The related mechanism is complex with respect to manner 1.

In manner 2, if one activation DCI activates priorities of at least two semi-persistent transmissions simultaneously, and the at least two activated semi-persistent transmissions are configured with different priorities by the RRC signaling, the priority indication information carried by the activation DCI is invalid at this time. For example, the priorities of the at least two activated semi-persistent transmissions are respectively in accordance with the respective priorities configured by the RRC signaling at this time.

With manner 2, when the base station or the UE needs at least two semi-persistent transmissions to be activated, the activation can be completed by using only one activation DCI, and according to the related mechanism, the activation DCI needs to be sent to the at least two semi-persistent transmissions one by one. The number of sending times of the activation DCI is reduced in manner 2 with respect to manner 1.

In manner 3, if one activation DCI activates at least two semi-persistent transmissions, and a semi-persistent transmission not configured with a priority by the RRC signaling exists in the at least two activated semi-persistent transmissions, the priority indication information carried by the activation DCI is applicable to the activated semi-persistent transmission not configured with the priority by the RRC signaling, and the priority indication information carried by the activation DCI is not applicable to the activated semi-persistent transmission configured with a priority by the RRC signaling.

In addition, in a case where the activation DCI activates a semi-persistent transmission, the priority of the semi-persistent transmission is determined in at least one of manners described below.

In processing a, for an activated semi-persistent transmission configured with a priority by the RRC, if the activation DCI does not carry priority indication information during the activation, the priority of the semi-persistent transmission is determined as the priority configured by the RRC.

In processing b, for an activated semi-persistent transmission not configured with a priority by the RRC, if the activation DCI does not carry priority indication information during the activation, the priority of the semi-persistent transmission is determined as a low priority (or a high priority).

In processing c, for an activated semi-persistent transmission configured with a priority by the RRC, if the activation DCI carries priority indication information during the activation, the priority of the semi-persistent transmission is determined according to the priority indication carried by the activation DCI.

In processing d, for an activated semi-persistent transmission not configured with a priority by the RRC, if the activation DCI carries priority indication information during the activation, the priority of the semi-persistent transmission is determined according to the priority indication carried by the activation DCI.

In processing e, for an activated semi-persistent transmission configured with a priority by the RRC, if the activation DCI carries priority indication information during the activation, the priority of the semi-persistent transmission is determined as a relatively high priority (or a relatively low priority) of the priority carried by the activation DCI and the priority configured by the RRC.

The preceding processing manners may be used in combination.

The benefits of manner 1 and manner 2 can be achieved in manner 3.

In manner 4, if one activation DCI activates at least two semi-persistent transmissions simultaneously, these semi-persistent transmissions must have the same priority configured by the RRC signaling, and the priority of the activated semi-persistent transmission is followed by or modified according to the priority indicated by the priority indication information carried by the active DCI.

The benefits of manner 1, manner 2 and manner 3 can be achieved in manner 4.

In the seventh example embodiment, if the activation DCI activates at least two semi-persistent transmissions simultaneously, the HARQ-ACK of the first PDSCH of each semi-persistent transmission may be fed back by methods described below.

The HARQ-ACK of the activation DCI performs feedback according to related parameters in the activation DCI. For example, an uplink feedback location and a physical uplink control channel (PUCCH) resource sent by the HARQ-ACK of the activation DCI are determined according to a PUCCH resource indication domain and a PDSCH-to-HARQ-ACK timing feedback domain in the activation DCI. The HARQ-ACK of the PDSCH of the at least two activated semi-persistent transmissions, including the HARQ-ACK of the first PDSCH of each semi-persistent transmission, are sent according to a PUCCH resource configured for the semi-persistent transmission.

Alternatively, if the activation DCI activates at least two semi-persistent transmissions simultaneously, and the at least two semi-persistent transmissions may be configured with different priorities by the RRC signaling, the HARQ-ACK of the activation DCI is associated with the first PDSCH of a designated semi-persistent transmission of the at least two activated semi-persistent transmissions. Here, the method for determining the designated semi-persistent transmission may be the methods in the first example embodiment and the second example embodiment. If the semi-persistent transmissions are configured with indexes according to the fourth example embodiment, the designated semi-persistent transmission may be determined according to the first example embodiment. The first PDSCH of the remaining semi-persistent transmission is sent according to the PUCCH resource configured for the remaining semi-persistent transmission.

Various manners in the preceding first to seventh example embodiments may be used in combination without collisions. The various manners are also applicable to determining the priority of the deactivation DCI for a semi-persistent transmission and the priority of the HARQ-ACK of the deactivation DCI. In the preceding various embodiments, the RRC signaling may configure a semi-persistent transmission with a priority or provide a mapping relationship. The mapping relationship is that the semi-persistent transmission corresponds to which HARQ-ACK codebook (that is, the HARQ-ACK of the semi-persistent transmission corresponds to a high-priority HARQ-ACK codebook or a low-priority HARQ-ACK codebook). If the semi-persistent transmission corresponds to a high-priority HARQ-ACK codebook, the semi-persistent transmission is high-priority, and if the semi-persistent transmission corresponds to a low-priority HARQ-ACK codebook, the semi-persistent transmission is low-priority. In the various manners in the preceding first to seventh example embodiments, determining the priority of the semi-persistent transmission is determining the priority of the HARQ-ACK of the semi-persistent transmission. The activation DCI or the deactivation DCI does not carry the priority indication in the preceding examples in one of following cases: the RRC signaling does not configure the priority indication domain for the activation DCI or the deactivation DCI; the activation DCI or the deactivation DCI carries a priority indication domain but the priority indication domain is agreed to be invalid; or the activation DCI or the deactivation DCI does not contain a priority indication domain (for example, when Fallback DCI (a DCI 1-0 format or a DCI 0-0 format) is used for activation or deactivation).

FIG. 3 illustrates a flowchart of another data processing method according to an embodiment. As shown in FIG. 3, the method provided in this embodiment is applicable to a first communication node. The method includes the following.

In S310, a first communication node configures and sends second control information to a second communication node.

The second control information includes: information for indicating that a state of a secondary cell serving the second communication node converts; and the second control information further includes at least one of following: information for indicating that the second control information is not used for scheduling user data, information for determining a hybrid automatic repeat request-acknowledgement (HARQ-ACK) information resource of the second control information, information for determining an interval timing from a slot where the second control information is located to a slot where HARQ-ACK of the second control information is located, information for determining an interval timing from a subslot where the second control information is located to a subslot where HARQ-ACK of the second control information is located, information for determining the location of HARQ-ACK of the second control information in a dynamic HARQ-ACK codebook, information of the priority of HARQ-ACK of the second control information, or information for determining the location of HARQ-ACK of the second control information in a semi-persistent HARQ-ACK codebook.

In an embodiment, the second control information sets or re-interprets part of bit fields in a format of downlink control information (DCI) of downlink scheduling data by using the format of the DCI, or sets or re-interprets part of bit fields in a format of DCI of uplink scheduling data by using the format of the DCI.

In an embodiment, in a case where the second control information sets or re-interprets the part of the bit fields in the format of the DCI of the downlink scheduling data by using the format of the DCI, at least one of definitions described below is included.

A physical uplink control channel (PUCCH) resource indication domain in the DCI is reused.

A physical downlink shared channel (PDSCH)-to-HARQ-ACK timing feedback domain in the DCI is re-interpreted as the interval timing from the slot where the second control information is located to the slot where the HARQ-ACK of the second control information is located.

A PDSCH-to-HARQ-ACK timing feedback domain in the DCI is re-interpreted as the interval timing from the subslot where the second control information is located to the subslot where the HARQ-ACK of the second control information is located.

A downlink assignment index (DAI) domain in the DCI is re-interpreted as for determining the location of the HARQ-ACK of the second control information in the dynamic HARQ-ACK codebook.

A PDSCH time domain resource allocation domain in the DCI is re-interpreted as for determining the location of the HARQ-ACK of the second control information in the semi-persistent HARQ-ACK codebook.

A PDSCH frequency domain resource allocation domain in the DCI is set as an agreed value, where the agreed value is used for representing that a bit field in the format of the DCI of the downlink scheduling data is used as the second control information. Optionally, the agreed value may be 0.

One bit field in the DCI is re-interpreted as for determining the priority of the HARQ-ACK of the second control information, where the one bit field does not include a PUCCH resource indication domain, a PDSCH-to-HARQ-ACK timing feedback domain, a DAI domain, a PDSCH time domain resource allocation domain and a PDSCH frequency domain resource allocation domain.

In an embodiment, in a case where the second control information sets or re-interprets the part of the bit fields in the format of the DCI of the uplink scheduling data by using the format of the DCI, at least one of definitions described below is included.

The first bit filed in the DCI is re-interpreted as a PUCCH resource indication domain.

The second bit field in the DCI is re-interpreted as the interval timing from the slot where the second control information is located to the slot where the HARQ-ACK of the second control information is located.

The second bit field in the DCI is re-interpreted as the interval timing from the subslot where the second control information is located to the subslot where the HARQ-ACK of the second control information is located.

The third bit field in the DCI is re-interpreted as a counter-DAI domain for determining the location of the HARQ-ACK of the second control information in the dynamic HARQ-ACK codebook.

The fourth bit field in the DCI is re-interpreted as a PDSCH time domain resource allocation domain for determining the location of the HARQ-ACK of the second control information in the semi-persistent HARQ-ACK codebook.

A PUSCH time-frequency resource allocation domain in the DCI is re-interpreted as a time-frequency resource domain for allocating the HARQ-ACK of the second control information.

One bit field in the DCI is re-interpreted as for determining the priority of the HARQ-ACK of the second control information, where the one bit field does not include the first bit field, the second bit field, the third bit field, the fourth bit filed and a PUSCH time-frequency resource allocation domain.

In an embodiment, in a case where the second control information is used for indicating that states of at least two secondary cells serving the second communication node convert, the HARQ-ACK of the second control information is counted in HARQ-ACK of a serving cell sending the second control information.

In a case where the second control information is used for indicating that states of at least two secondary cells serving the second communication node convert, the HARQ-ACK of the second control information is counted in HARQ-ACK of a serving cell having the smallest index or the largest index of serving cells states of which convert indicated by the second control information.

In a case where the second control information is used for indicating that states of at least two secondary cells serving the second communication node convert, the HARQ-ACK of the second control information is associated with one serving cell, where the one serving cell is a serving cell indicated by the second control information for association.

In an embodiment, in a case where the HARQ-ACK of the second control information is in combination with the semi-persistent HARQ-ACK codebook, the first communication node determines a PDSCH from an associated serving cell, and determines the location of the HARQ-ACK of the second control information in the semi-persistent HARQ-ACK codebook by using the receiving location of the PDSCH.

FIG. 4 illustrates a flowchart of another data processing method according to an embodiment. As shown in FIG. 4, the method provided in this embodiment is applicable to a second communication node. The method includes the following.

In S410, a second communication node receives second control information sent by a first communication node.

The second control information includes: information for indicating that a state of a secondary cell serving the second communication node converts; and the second control information further includes at least one of following pieces of information: information for indicating that the second control information is not used for scheduling user data, information for determining a hybrid automatic repeat request-acknowledgement (HARQ-ACK) information resource of the second control information, information for determining an interval timing from a slot where the second control information is located to a slot where HARQ-ACK of the second control information is located, information for determining an interval timing from a subslot where the second control information is located to a subslot where HARQ-ACK of the second control information is located, information for determining the location of HARQ-ACK of the second control information in a dynamic HARQ-ACK codebook, information of the priority of HARQ-ACK of the second control information, or information for determining the location of HARQ-ACK of the second control information in a semi-persistent HARQ-ACK codebook.

In an embodiment, the second control information sets or re-interprets part of bit fields in a format of downlink control information (DCI) of downlink scheduling data by using the format of the DCI, or sets or re-interprets part of bit fields in a format of DCI of uplink scheduling data by using the format of the DCI.

In an embodiment, in a case where the second control information sets or re-interprets the part of the bit fields in the format of the DCI of the downlink scheduling data by using the format of the DCI, at least one of definitions described below is included.

A physical uplink control channel (PUCCH) resource indication domain in the DCI is reused.

A physical downlink shared channel (PDSCH)-to-HARQ-ACK timing feedback domain in the DCI is re-interpreted as the interval timing from the slot where the second control information is located to the slot where the HARQ-ACK of the second control information is located.

A PDSCH-to-HARQ-ACK timing feedback domain in the DCI is re-interpreted as the interval timing from the subslot where the second control information is located to the subslot where the HARQ-ACK of the second control information is located.

A downlink assignment index (DAI) domain in the DCI is re-interpreted as for determining the location of the HARQ-ACK of the second control information in the dynamic HARQ-ACK codebook.

A PDSCH time domain resource allocation domain in the DCI is re-interpreted as for determining the location of the HARQ-ACK of the second control information in the semi-persistent HARQ-ACK codebook.

A PDSCH frequency domain resource allocation domain in the DCI is set as an agreed value, where the agreed value is used for representing that a bit field in the format of the DCI of the downlink scheduling data is used as the second control information. Optionally, the agreed value may be 0.

One bit field in the DCI is re-interpreted as for determining the priority of the HARQ-ACK of the second control information, where the one bit field does not include a PUCCH resource indication domain, a PDSCH-to-HARQ-ACK timing feedback domain, a DAI domain, a PDSCH time domain resource allocation domain and a PDSCH frequency domain resource allocation domain.

In an embodiment, in a case where the second control information sets or re-interprets the part of the bit fields in the format of the DCI of the uplink scheduling data by using the format of the DCI, at least one of definitions described below is included.

The first bit filed in the DCI is re-interpreted as a PUCCH resource indication domain.

The second bit field in the DCI is re-interpreted as the interval timing from the slot where the second control information is located to the slot where the HARQ-ACK of the second control information is located.

The second bit field in the DCI is re-interpreted as the interval timing from the subslot where the second control information is located to the subslot where the HARQ-ACK of the second control information is located.

The third bit field in the DCI is re-interpreted as a counter-DAI domain for determining the location of the HARQ-ACK of the second control information in the dynamic HARQ-ACK codebook.

The fourth bit field in the DCI is re-interpreted as a PDSCH time domain resource allocation domain for determining the location of the HARQ-ACK of the second control information in the semi-persistent HARQ-ACK codebook.

A PUSCH time-frequency resource allocation domain in the DCI is re-interpreted as a time-frequency resource domain for allocating the HARQ-ACK of the second control information.

One bit field in the DCI is re-interpreted as for determining the priority of the HARQ-ACK of the second control information, where the one bit field does not include the first bit field, the second bit field, the third bit field, the fourth bit filed and a PUSCH time-frequency resource allocation domain.

In an embodiment, in a case where the second control information is used for indicating that states of at least two secondary cells serving the second communication node convert, the HARQ-ACK of the second control information is counted in HARQ-ACK of a serving cell sending the second control information.

In a case where the second control information is used for indicating that states of at least two secondary cells serving the second communication node convert, the HARQ-ACK of the second control information is counted in HARQ-ACK of a serving cell having the smallest index or the largest index of serving cells states of which convert indicated by the second control information.

In a case where the second control information is used for indicating that states of at least two secondary cells serving the second communication node convert, the HARQ-ACK of the second control information is associated with one serving cell, where the one serving cell is a serving cell indicated by the second control information for association.

In an embodiment, in a case where the HARQ-ACK of the second control information is in combination with the semi-persistent HARQ-ACK codebook, the receiving location of a PDSCH determined from an associated serving cell is used for determining the location of the HARQ-ACK of the second control information in the semi-persistent HARQ-ACK codebook.

Some example implementations are listed below to explain the data processing method provided in FIG. 3 or FIG. 4 of the embodiments of the present application. The example implementations described below may be executed alone or in combination with each other, which is not specifically limited in the embodiments of the present application.

In the discussion of the NR system, it is considered to introduce a dormant secondary cell (Scell), and the base station notifies the UE whether a normal Scell is converted into a dormant Scell or whether a dormant Scell is converted into a normal Scell, which is mainly for saving energy.

The manner for the base station to notify the UE includes using physical layer signaling, for example, a PDCCH carries one specially designed DCI to notify the UE, and this special DCI (corresponding to the preceding second control information) does not schedule data. If the UE is notified by using this mechanism, to ensure the reliability, it needs to consider designing a corresponding HARQ-ACK feedback for this notification signaling, that is, designing a corresponding HARQ-ACK feedback for the DCI signaling used for notifying the UE of the Scell conversion, and the DCI does not schedule data.

If the preceding special DCI is obtained by improving the DCI of downlink scheduling data, and considering that the special DCI needs to support a HARQ-ACK feedback, it is considered to use the manner described below to improve the DCI of the downlink scheduling data.

In the eighth example embodiment, considering that this special DCI does not schedule downlink data, it is suggested to have a PUCCH resource indication domain and a PDSCH-to-HARQ-ACK timing feedback domain in the special DCI. These two domains are used for determining a PUCCH resource and the location of the HARQ-ACK feedback of the special DCI. Here, the PDSCH-to-HARQ-ACK timing feedback domain and the PUCCH resource indication domain may also be pre-agreed, which can reduce the overhead of the special DCI.

In this manner, it can be ensured that the HARQ-ACK of the special DCI is sent independently. However, since the HARQ-ACK of the special DCI may also be transmitted after being in combination with a semi-persistent HARQ-ACK codebook or a dynamic HARQ-ACK codebook, for this case, manners described below may be considered.

In the ninth example embodiment, the special DCI further has a downlink assignment index (DAI) domain based on the eighth example embodiment. This DAI domain is used for determining the location of the HARQ-ACK of the special DCI in the dynamic HARQ-ACK codebook. In this manner, the location of the HARQ-ACK of the special DAI in the dynamic HARQ-ACK codebook can be determined when the HARQ-ACK of the special DCI is transmitted in combination with the dynamic HARQ-ACK codebook.

In the tenth example embodiment, based on the eighth example embodiment, the special DCI further has allocation information of a PDSCH resource, and the PDSCH is not used for transmitting data, that is, the location of this PDSCH resource is used for determining the location of the HARQ-ACK of the special DCI in the semi-persistent HARQ-ACK codebook. To reduce overhead, the allocation information of the PDSCH resource here may be merely related to PDSCH time domain resource allocation, not related to PDSCH frequency domain resource allocation.

In an embodiment, the HARQ-ACK of the special DCI is associated with a serving cell (which may also be described here as a carrier) sending the special DCI, that is, when multiple carriers exist, the HARQ-ACK of the special DCI is counted in the HARQ-ACK of the carrier sending the special DCI. Alternatively, the HARQ-ACK of the special DCI is associated with a secondary cell (Scell) the state of which needs to convert indicated by the special DCI. If the special DCI simultaneously indicates at least two Scells states of which convert, the Scell having the smallest index or the largest index is selected for the association (or the special DCI indicates a serving cell, and the HARQ-ACK of the special DCI is associated with the indicated serving cell). That is, when multiple carriers exist, the special DCI is sent by a serving cell 1 but is used for indicating that a Scell2 and a Scell3 perform state conversion, and at this time, the HARQ-ACK of the special DCI is associated with the Scell2 (it is assumed that the index of the Scell2 is the smallest).

After the HARQ-ACK of the special DCI is associated with a serving cell, it is only determined that the HARQ-ACK of the special DCI is counted in the HARQ-ACK of that carrier, and the receiving location of a PDSCH needs to be further determined from the serving cell to determine the location of the HARQ-ACK of the special DCI in the semi-persistent HARQ-ACK codebook.

In this manner, the location of the HARQ-ACK of the special DCI in the semi-persistent HARQ-ACK codebook can be determined when the HARQ-ACK of the special DCI is in combination with the semi-persistent HARQ-ACK codebook.

If the preceding special DCI is obtained by improving the DCI of uplink scheduling data, and considering that the special DCI needs to support a HARQ-ACK feedback, it is considered to use the manner described below to improve the DCI of the uplink scheduling data.

In the eleventh example embodiment, a PUCCH resource indication domain and a PDSCH-to-HARQ-ACK timing feedback domain are added to the special DCI. These two domains are used for determining a PUCCH resource and the location of a HARQ-ACK feedback of the special DCI. Here, the PDSCH-to-HARQ-ACK timing feedback domain and the PUCCH resource indication domain may also be pre-agreed, which can reduce the overhead of the special DCI. The preceding two domains may also be implemented by re-interpreting other parameters in the DCI scheduling uplink data, since the DCI scheduling the uplink data has a large number of other domains available for re-interpretation due to no longer scheduling the uplink data.

In this manner, it can be ensured that the HARQ-ACK of the special DCI is sent independently. However, since the HARQ-ACK of the special DCI may also be transmitted after being in combination with a semi-persistent HARQ-ACK codebook or a dynamic HARQ-ACK codebook, for this case, manners described below may be considered.

In the twelfth example embodiment, a counter downlink assignment index (counter-DAI) domain is further added to the special DCI based on the eleventh example embodiment. This counter downlink assignment index domain is used for determining the location of the HARQ-ACK of the special DCI in the dynamic HARQ-ACK codebook. In this manner, the location of the HARQ-ACK of the special DAI in the dynamic HARQ-ACK codebook can be determined when the HARQ-ACK of the special DCI is transmitted in combination with the dynamic HARQ-ACK codebook.

In the thirteenth example embodiment, based on the eleventh example embodiment, allocation information of a PDSCH resource is further added to the special DCI, and the PDSCH is not used for transmitting data, that is, the location of this PDSCH resource is used for determining the location of the HARQ-ACK of the special DCI in the semi-persistent HARQ-ACK codebook. To reduce overhead, the allocation information of the PDSCH resource here may be merely related to PDSCH time domain resource allocation, not related to PDSCH frequency domain resource allocation.

In the fourteenth example embodiment, the HARQ-ACK of the special DCI is associated with a serving cell (which may also be described here as a carrier) sending the special DCI, that is, when multiple carriers exist, the HARQ-ACK of the special DCI is counted in the HARQ-ACK of the carrier sending the special DCI. Alternatively, the HARQ-ACK of the special DCI is associated with a secondary cell (Scell) the state of which needs to convert indicated by the special DCI. If the special DCI simultaneously indicates at least two Scells states of which convert, the Scell having the smallest index or the largest index is selected for the association (or the special DCI indicates a serving cell, and the HARQ-ACK of the special DCI is associated with the indicated serving cell). That is, when multiple carriers exist, the special DCI is sent by a serving cell 1 but is used for indicating that a Scell2 and a Scell3 perform state conversion, and at this time, the HARQ-ACK of the special DCI is associated with the Scell2 (it is assumed that the index of the Scell2 is the smallest).

After the HARQ-ACK of the special DCI is associated with a serving cell, it is only determined that the HARQ-ACK of the special DCI is counted in the HARQ-ACK of that carrier, and the receiving location of a PDSCH needs to be further determined from the serving cell to determine the location of the HARQ-ACK of the special DCI in the semi-persistent HARQ-ACK codebook.

In this manner, the location of the HARQ-ACK of the special DCI in the semi-persistent HARQ-ACK codebook can be determined when the HARQ-ACK of the special DCI is in combination with the semi-persistent HARQ-ACK codebook.

In the fifteenth example embodiment, the special DCI has a PUSCH resource for allocation, and the PUSCH resource transmits the HARQ-ACK of the special DCI. That is, the base station sends the special DCI to the UE and a PUSCH resource for allocation is carried, and the UE transmits the HARQ-ACK of the special DCI in the PUSCH resource. The HARQ-ACK of the special DCI here may be in the form of a media access control (MAC) layer control unit.

Based on the preceding eighth to fifteenth example embodiments, to solve the problem of how to determine the priority of the HARQ-ACK of the special DCI, a priority indication domain may be added to the special DCI. The priority indication domain is used for indicating the priority corresponding to the HARQ-ACK of the special DCI. Alternatively, a certain bit field in the DCI other than the bit fields described in the preceding manners 10 to 17 is re-interpreted as a priority bit field describing the HARQ-ACK of the special DCI.

In this manner, when the HARQ-ACK of the special DCI is in combination with a semi-persistent HARQ-ACK codebook (or a dynamic HARQ-ACK codebook), the HARQ-ACK of the special DCI may be in combination into codebooks having different priorities according to the priority. In an embodiment, it is suggested that the base station and the UE agree on that the HARQ-ACK of the special DCI generally has a high priority to avoid being dropped when a transmission collision occurs.

In the 5G technology, to ensure the cover the low-latency and highly-reliable transmission service in a relatively short transmission time, the Transport Block Repetition for Uplink Transmission with a Configured Grant technology is introduced. It is specified in Release 15 standard that the repeated transmission of a transport block (TB) is slot-based repetition, that is, a TB is repeatedly sent by using multiple slots. The TB is sent only once in each slot, and the TB has the same time domain resource allocation on each slot.

To optimize the traffic performance of the ultra-highly-reliable and ultra-low-latency transmission, it is necessary to enhance the Transport Block Repetition for Uplink Transmission with a Configured Grant in Release 16 standard. That is, it is introduced that the same TB is repeatedly sent once or more than once in the same slot, or the same TB is repeatedly sent across the slot boundary of multiple consecutive available slots.

For a Type 1 PUSCH transmissions with a configured grant and a Type 2 PUSCH transmissions with a configured grant, the time domain resource allocation (TDRA) table of Release 15 has been explicitly defined, but how to define the time domain resource allocation table of Release 16 has not been solved yet.

The Type 1 PUSCH transmissions with a configured grant is configured with scheduling information by RRC, and the Type 2 PUSCH transmissions with a configured grant is configured with scheduling information by activation DCI.

Specifically, the time domain resource allocation table of Release 16 is determined according to methods described below.

In method 1, the Type 1 PUSCH transmissions with a configured grant is configured with a TDRA table by RRC signaling, and the TDRA table is different from the table used by the Type 2 PUSCH transmissions with a configured grant.

In an embodiment, the TDRA table used by the Type 1 PUSCH transmissions with a configured grant does not include the indication of the number of repetitions, and the table used by the Type 2 PUSCH transmissions with a configured grant includes the indication of the number of repetitions.

In an embodiment, the TDRA table used by the Type 1 PUSCH transmissions with a configured grant independently indicates a start symbol S of a time domain resource and the number L of time domain duration symbols of the time domain resource of data, and S+L may be an integer number greater than 14.

In an embodiment, the Type 2 PUSCH transmissions with a configured grant uses a TDRA table for dynamically scheduling.

Specifically, as shown in Table 1, K2 refers to a slot offset, which is the length of time between a terminal receiving the DCI to sending a PUSCH. S refers to the start symbol of a time domain resource of the PUSCH, L refers to the number of time domain duration symbols of the time domain resource of the PUSCH, and S+L may be an integer greater than 14.

TABLE 1

TDRA information table

| Row index | PUSCH mapping type | K2 | S | L |
|---|---|---|---|---|
| 1 | Type B | 0 | 7 | 12 |
| ... | ... | ... | ... | ... |

When a network side indicates using the PUSCH transmission type of Release 16, the terminal uses a newly-defined TDRA table to determine the time domain allocation resource.

In an embodiment, the newly-defined table may be as shown in Table 2, where a column Number of repetitions is added based on Table 1 to indicate the number of repetitions.

TABLE 2

Another TDRA information table

| Row index | PUSCH mapping type | K2 | S | L | Number of repetitions |
|---|---|---|---|---|---|
| 1 | Type B | 0 | 7 | 12 | 2 |
| ... | ... | ... | ... | ... | ... |

In method 2, for the PUSCH of Release 16, multiple TDRA tables exist. For example, different TDRA tables exist for different DCI formats. For example, the table configured for DCI format 0_1 is TDRAforDCIformat 0_1, and the table configured for DCI format 0_2 is TDRAforDCIformat 0_2.

Moreover, the TDRA table for Release 15 that is approved by the standard is referred to here as a legacy TDRA table.

For the terminal, the time domain allocation information used by Release 16 is determined based on these three tables by using at least one of methods described below.

In method A, the time domain allocation information is determined according to a predefined rule. Specifically, when the network side indicates using the PUSCH transmission type of Release 15, the terminal uses the legacy TDRA table. When the network side indicates using the PUSCH transmission type of Release 16, the terminal uses the table TDRAforDCIformat 0_2; or when the network side indicates using the PUSCH transmission type of Release 16, the terminal uses the table TDRAforDCIformat 0_1.

In method B, the time domain allocation information is determined according to the indication of the RRC signaling. Specifically, when the network side indicates using the PUSCH transmission type of Release 15, the terminal uses the legacy TDRA table. When the network side indicates using the PUSCH transmission type of Release 16, the table TDRAforDCIformat 0_1 or the table TDRAforDCIformat 0_2 is selected for use according to the RRC signaling.

Specifically, the content of the RRC signaling is the table TDRAforDCIformat 0_1. If the RRC signaling does not perform configuration, the table TDRAforDCIformat 0_2 is used by default.

Alternatively, the content of the RRC signaling is the table TDRAforDCIformat 0_2. If the RRC signaling does not perform configuration, the table TDRAforDCIformat 0_1 is used by default.

Alternatively, the RRC signaling indicates two logical values. When the first logical value is indicated, the terminal uses the TDRA table corresponding to TDRAforDCIformat 0_2. When the second logical value is indicated, the terminal uses the TDRA table corresponding to TDRAforDCIformat 0_1.

In method C, the time domain allocation information is determined according to the indication of the RRC signaling.

Specifically, the RRC signaling indicates three logical values. When the third logical value is indicated, the terminal uses the legacy TDRA table. When the fourth logical value is indicated, the terminal uses the table TDRAforDCIformat 0_2. When the fifth logical value is indicated, the terminal uses the table TDRAforDCIformat 0_1.

In method D, the time domain allocation information is determined according to the indication of the RRC signaling.

Specifically, the content of the first RRC signaling is the legacy TDRA table, and the second RRC signaling indicates two logical values. If the first RRC signaling does not perform configuration, and the second RRC signaling indicates the sixth logical value, the terminal uses the table TDRAforDCIformat 0_2. Alternatively, if the first RRC signaling does not perform configuration, and the second RRC signaling indicates the seventh logical value, the terminal uses the table TDRAforDCIformat 0_1.

Alternatively, specifically, the content of the third RRC signaling is the table TDRAforDCIformat 01, and the fourth RRC signaling indicates two logical values. If the third RRC signaling does not perform configuration, and the fourth RRC signaling indicates the eighth logical value, the terminal uses the table TDRAforDCIformat 0_2. Alternatively, if the third RRC signaling does not perform configuration, and the fourth RRC signaling indicates the ninth logical value, the terminal uses the legacy TDRA table.

Alternatively, specifically, the content of the fifth RRC signaling is the table TDRAforDCIformat 02, and the sixth RRC signaling indicates two logical values. If the fifth RRC signaling does not perform configuration, and the sixth RRC signaling indicates the tenth logical value, the terminal uses the table TDRAforDCIformat 0_1. Alternatively, if the fifth RRC signaling does not perform configuration, and the sixth RRC signaling indicates the eleventh logical value, the terminal uses the legacy TDRA table.

The table TDRAforDCIformat 0_2 and the table TDRAforDCIformat 0_1 mentioned in A, B, C and D may include the column indicating the number of repetitions, or the two tables may not include the column indicating the number of repetitions.

The embodiment is only explained by taking an uplink PUSCH as an example, and the transmission repetition information may also be carried on physical layer channels such as a PDSCH, a PDCCH, etc.

FIG. 5 illustrates a structural diagram of a data processing apparatus according to an embodiment. The data processing apparatus may be configured in a first communication node. As shown in FIG. 5, the data processing apparatus includes: a sending module 10.

The sending module 10 is configured to send first control information to a second communication node, where the first control information is used for activating or deactivating at least one semi-persistent transmission, the first control information is associated with the first semi-persistent transmission, and the at least one semi-persistent transmission includes the first semi-persistent transmission.

The data processing apparatus provided in the embodiment may implement the data processing method of the preceding embodiments. The data processing apparatus provided in the embodiment has the same implementation principles and technical effects as the preceding embodiments, which are not repeated here.

In an embodiment, in a case where the first control information is used for deactivating at least two semi-persistent transmissions, and the at least two semi-persistent transmissions have the same priority, the location of hybrid automatic repeat request-acknowledgement (HARQ-ACK) information of the first control information in a semi-persistent HARQ-ACK codebook is associated with a physical downlink shared channel (PDSCH) of the first semi-persistent transmission.

The index of the first semi-persistent transmission is the smallest among indexes of all deactivated semi-persistent transmissions.

The index of the first semi-persistent transmission is the largest among indexes of all deactivated semi-persistent transmissions.

The first semi-persistent transmission is indicated by a piece of indication information carried by the first control information, where the piece of indication information is PDSCH time domain resource allocation information corresponding to the at least two deactivated semi-persistent transmissions, or the piece of indication information is an order index value after index values of the at least two deactivated semi-persistent transmissions are sorted in ascending order or descending order.

In an embodiment, in a case where the first control information is used for deactivating at least two semi-persistent transmissions, and the at least two semi-persistent transmissions have different priorities, the location of HARQ-ACK of the first control information in a semi-persistent HARQ-ACK codebook is associated with a PDSCH of the first semi-persistent transmission.

The first semi-persistent transmission is a semi-persistent transmission having the highest priority among all deactivated semi-persistent transmissions.

The first semi-persistent transmission is a semi-persistent transmission having the lowest priority among all deactivated semi-persistent transmissions.

The first semi-persistent transmission is a semi-persistent transmission having the highest priority among all deactivated semi-persistent transmissions, and the index of the first semi-persistent transmission is the smallest among indexes of all deactivated semi-persistent transmissions having the highest priority.

The first semi-persistent transmission is a semi-persistent transmission having the highest priority among all deactivated semi-persistent transmissions, and the index of the first semi-persistent transmission is the largest among indexes of all deactivated semi-persistent transmissions having the highest priority.

The first semi-persistent transmission is a semi-persistent transmission having the lowest priority among all deactivated semi-persistent transmissions, and the index of the first semi-persistent transmission is the smallest among indexes of all deactivated semi-persistent transmissions having the highest priority.

The first semi-persistent transmission is a semi-persistent transmission having the lowest priority among all deactivated semi-persistent transmissions, and the index of the first semi-persistent transmission is the largest among indexes of all deactivated semi-persistent transmissions having the highest priority.

In an embodiment, in a case where at least two semi-persistent transmissions have different priorities, the first communication node configures the index value of a high-priority semi-persistent transmission to be smaller than the index value of a low-priority semi-persistent transmission, or the first communication node configures the index value of a high-priority semi-persistent transmission to be larger than the index value of a low-priority semi-persistent transmission.

In an embodiment, in a case where the first control information is used for deactivating at least two semi-persistent transmissions, the priority of HARQ-ACK of the first control information is determined in one of manners described below.

The priority of the HARQ-ACK of the first control information is determined according to priority indication information carried by the first control information.

The priority of the HARQ-ACK of the first control information is determined according to the priority of a semi-persistent transmission having the highest priority configured by radio resource control (RRC) signaling of the at least two deactivated semi-persistent transmissions.

The priority of the HARQ-ACK of the first control information is determined according to a relatively high priority of priority indication information carried by the first control information and priorities configured by RRC signaling of the at least two deactivated semi-persistent transmissions, where in a case where the first control information does not carry the priority indication information, the priority indication information carried by the first control information is determined as a low priority.

In a case where the first control information carries priority indication information, the priority of the HARQ-ACK of the first control information is determined according to the priority indication information carried by the first control information; otherwise, in response to the at least two deactivated semi-persistent transmissions being configured with priorities by RRC signaling, the priority of the HARQ-ACK of the first control information is determined according to a high priority of the priorities configured by the RRC signaling of the at least two deactivated semi-persistent transmissions; or otherwise, the HARQ-ACK of the first control information is determined as a low priority.

In a case where the at least two deactivated semi-persistent transmissions is configured with priorities by RRC signaling, the priority of the HARQ-ACK of the first control information is determined according to a high priority of the priorities configured by the RRC signaling of the at least two deactivated semi-persistent transmissions; in a case where the at least two deactivated semi-persistent transmissions is not configured with priorities by RRC signaling, the HARQ-ACK of the first control information is determined as a low priority.

In a case where a semi-persistent transmission is not configured with a priority by RRC signaling, it is determined that the semi-persistent transmission is configured with a low priority by the RRC signaling.

In an embodiment, in a case where the first control information is used for activating at least two semi-persistent transmissions, and the at least two semi-persistent transmissions have different priorities, priority indication information carried by the first control information is valid and is applicable to the at least two semi-persistent transmissions.

In a case where the first control information is used for activating at least two semi-persistent transmissions, and the at least two semi-persistent transmissions have different priorities, priority indication information carried by the first control information is invalid and is not applicable to the at least two semi-persistent transmissions.

In a case where the first control information is used for activating at least two semi-persistent transmissions, and a semi-persistent transmission not configured with a priority by RRC signaling exists in the at least two semi-persistent transmissions, the priority of the semi-persistent transmission not configured with the priority by the RRC signaling is determined according to priority indication information carried by the first control information.

In a case where the first control information is used for activating at least two semi-persistent transmissions, and the at least two semi-persistent transmissions are required to have the same priority configured by RRC signaling, the priority indicated by priority indication information carried by the first control information is allowed to follow or modify the priority configured by the RRC signaling of the at least two semi-persistent transmissions.

In an embodiment, in a case where the first control information is used for activating one semi-persistent transmission, and the one semi-persistent transmission is configured with a priority by RRC signaling, in response to the first control information not carrying priority indication information, the priority of the one semi-persistent transmission is determined according to the priority configured by the RRC signaling.

In a case where the first control information is used for activating one semi-persistent transmission, and the one semi-persistent transmission is not configured with a priority by RRC signaling, in response to the first control information not carrying priority indication information, the priority of the one semi-persistent transmission is determined according to a high priority or a low priority.

In a case where the first control information is used for activating one semi-persistent transmission, and the one semi-persistent transmission is configured with a priority by RRC signaling, in response to the first control information carrying priority indication information, the priority of the one semi-persistent transmission is determined according to the priority indication information carried by the first control information.

In a case where the first control information is used for activating one semi-persistent transmission, and the one semi-persistent transmission is not configured with a priority by RRC signaling, in response to the first control information carrying priority indication information, the priority of the one semi-persistent transmission is determined according to the priority indication information carried by the first control information.

In a case where the first control information is used for activating one semi-persistent transmission, and the one semi-persistent transmission is configured with a priority by RRC signaling, in response to the first control information carrying priority indication information, the priority of the one semi-persistent transmission is determined according to a relatively high priority or a relatively low priority of the priority indication information carried by the first control information and the priority configured by the RRC signaling.

In an embodiment, in a case where the first control information is used for deactivating one semi-persistent transmission, and the one semi-persistent transmission is configured with a priority by RRC signaling, in response to the first control information not carrying priority indication information, the priority of the one semi-persistent transmission is determined according to the priority configured by the RRC signaling.

In a case where the first control information is used for deactivating one semi-persistent transmission, and the one semi-persistent transmission is not configured with a priority by RRC signaling, in response to the first control information not carrying priority indication information, the priority of the one semi-persistent transmission is determined according to a high priority or a low priority.

In a case where the first control information is used for deactivating one semi-persistent transmission, and the one semi-persistent transmission is configured with a priority by RRC signaling, in response to the first control information carrying priority indication information, the priority of the one semi-persistent transmission is determined according to the priority indication information carried by the first control information.

In a case where the first control information is used for deactivating one semi-persistent transmission, and the one semi-persistent transmission is not configured with a priority by RRC signaling, in response to the first control information carrying priority indication information, the priority of the one semi-persistent transmission is determined according to the priority indication information carried by the first control information.

In a case where the first control information is used for deactivating one semi-persistent transmission, and the one semi-persistent transmission is configured with a priority by RRC signaling, in response to the first control information carrying priority indication information, the priority of the one semi-persistent transmission is determined according to a relatively high priority or a relatively low priority of the priority indication information carried by the first control information and the priority configured by the RRC signaling.

FIG. 6 illustrates a structural diagram of another data processing apparatus according to an embodiment. The data processing apparatus may be configured in a second communication node. As shown in FIG. 6, the data processing apparatus includes: a reception module 20.

The reception module 20 is configured to receive first control information sent by a first communication node, where the first control information is used for activating or deactivating at least one semi-persistent transmission, the first control information is associated with the first semi-persistent transmission, and the at least one semi-persistent transmission includes the first semi-persistent transmission.

The data processing apparatus provided in the embodiment may implement the data processing method of the preceding embodiments. The data processing apparatus provided in the embodiment has the same implementation principles and technical effects as the preceding embodiments, which are not repeated here.

In an embodiment, in a case where the first control information is used for deactivating at least two semi-persistent transmissions, and the at least two semi-persistent transmissions have the same priority, the location of hybrid automatic repeat request-acknowledgement (HARQ-ACK) information of the first control information in a semi-persistent HARQ-ACK codebook is associated with a physical downlink shared channel (PDSCH) of the first semi-persistent transmission.

The index of the first semi-persistent transmission is the smallest among indexes of all deactivated semi-persistent transmissions.

The index of the first semi-persistent transmission is the largest among indexes of all deactivated semi-persistent transmissions.

The first semi-persistent transmission is indicated by a piece of indication information carried by the first control information, where the piece of indication information is PDSCH time domain resource allocation information corresponding to the at least two deactivated semi-persistent transmissions, or the piece of indication information is an order index value after index values of the at least two deactivated semi-persistent transmissions are sorted in ascending order or descending order.

In an embodiment, in a case where the first control information is used for deactivating at least two semi-persistent transmissions, and the at least two semi-persistent transmissions have different priorities, the location of HARQ-ACK of the first control information in a semi-persistent HARQ-ACK codebook is associated with a PDSCH of the first semi-persistent transmission.

The first semi-persistent transmission is a semi-persistent transmission having the highest priority among all deactivated semi-persistent transmissions.

The first semi-persistent transmission is a semi-persistent transmission having the lowest priority among all deactivated semi-persistent transmissions.

The first semi-persistent transmission is a semi-persistent transmission having the highest priority among all deactivated semi-persistent transmissions, and the index of the first semi-persistent transmission is the smallest among indexes of all deactivated semi-persistent transmissions having the highest priority.

The first semi-persistent transmission is a semi-persistent transmission having the highest priority among all deactivated semi-persistent transmissions, and the index of the first semi-persistent transmission is the largest among indexes of all deactivated semi-persistent transmissions having the highest priority.

The first semi-persistent transmission is a semi-persistent transmission having the lowest priority among all deactivated semi-persistent transmissions, and the index of the first semi-persistent transmission is the smallest among indexes of all deactivated semi-persistent transmissions having the highest priority.

The first semi-persistent transmission is a semi-persistent transmission having the lowest priority among all deactivated semi-persistent transmissions, and the index of the first semi-persistent transmission is the largest among indexes of all deactivated semi-persistent transmissions having the highest priority.

In an embodiment, in a case where at least two semi-persistent transmissions have different priorities, the index value of a high-priority semi-persistent transmission is smaller than the index value of a low-priority semi-persistent transmission, or the index value of a high-priority semi-persistent transmission is larger than the index value of a low-priority semi-persistent transmission.

In an embodiment, in a case where the first control information is used for deactivating at least two semi-persistent transmissions, the priority of HARQ-ACK of the first control information is determined in one of manners described below.

The priority of the HARQ-ACK of the first control information is determined according to priority indication information carried by the first control information.

The priority of the HARQ-ACK of the first control information is determined according to the priority of a semi-persistent transmission having the highest priority configured by radio resource control (RRC) signaling of the at least two deactivated semi-persistent transmissions.

The priority of the HARQ-ACK of the first control information is determined according to a relatively high priority of priority indication information carried by the first control information and priorities configured by RRC signaling of the at least two deactivated semi-persistent transmissions, where in a case where the first control information does not carry the priority indication information, the priority indication information carried by the first control information is determined as a low priority.

In a case where the first control information carries priority indication information, the priority of the HARQ-ACK of the first control information is determined according to the priority indication information carried by the first control information; otherwise, in response to the at least two deactivated semi-persistent transmissions being configured with priorities by RRC signaling, the priority of the HARQ-ACK of the first control information is determined according to a high priority of the priorities configured by the RRC signaling of the at least two deactivated semi-persistent transmissions; or otherwise, the HARQ-ACK of the first control information is determined as a low priority.

In a case where the at least two deactivated semi-persistent transmissions is configured with priorities by RRC signaling, the priority of the HARQ-ACK of the first control information is determined according to a high priority of the priorities configured by the RRC signaling of the at least two deactivated semi-persistent transmissions; in a case where the at least two deactivated semi-persistent transmissions is not configured with priorities by RRC signaling, the HARQ-ACK of the first control information is determined as a low priority.

In a case where a semi-persistent transmission is not configured with a priority by RRC signaling, it is determined that the semi-persistent transmission is configured with a low priority by the RRC signaling.

In an embodiment, in a case where the first control information is used for activating at least two semi-persistent transmissions, and the at least two semi-persistent transmissions have different priorities, priority indication information carried by the first control information is valid and is applicable to the at least two semi-persistent transmissions.

In a case where the first control information is used for activating at least two semi-persistent transmissions, and the at least two semi-persistent transmissions have different priorities, priority indication information carried by the first control information is invalid and is not applicable to the at least two semi-persistent transmissions.

In a case where the first control information is used for activating at least two semi-persistent transmissions, and a semi-persistent transmission not configured with a priority by RRC signaling exists in the at least two semi-persistent transmissions, the priority of the semi-persistent transmission not configured with the priority by the RRC signaling is determined according to priority indication information carried by the first control information.

In a case where the first control information is used for activating at least two semi-persistent transmissions, and the at least two semi-persistent transmissions are required to have the same priority configured by RRC signaling, the priority indicated by priority indication information carried by the first control information is allowed to follow or modify the priority configured by the RRC signaling of the at least two semi-persistent transmissions.

In an embodiment, in a case where the first control information is used for activating one semi-persistent transmission, and the one semi-persistent transmission is configured with a priority by RRC signaling, in response to the first control information not carrying priority indication information, the priority of the one semi-persistent transmission is determined according to the priority configured by the RRC signaling.

In a case where the first control information is used for activating one semi-persistent transmission, and the one semi-persistent transmission is not configured with a priority by RRC signaling, in response to the first control information not carrying priority indication information, the priority of the one semi-persistent transmission is determined according to a high priority or a low priority.

In a case where the first control information is used for activating one semi-persistent transmission, and the one semi-persistent transmission is configured with a priority by RRC signaling, in response to the first control information carrying priority indication information, the priority of the one semi-persistent transmission is determined according to the priority indication information carried by the first control information.

In a case where the first control information is used for activating one semi-persistent transmission, and the one semi-persistent transmission is not configured with a priority by RRC signaling, in response to the first control information carrying priority indication information, the priority of the one semi-persistent transmission is determined according to the priority indication information carried by the first control information.

In a case where the first control information is used for activating one semi-persistent transmission, and the one semi-persistent transmission is configured with a priority by RRC signaling, in response to the first control information carrying priority indication information, the priority of the one semi-persistent transmission is determined according to a relatively high priority or a relatively low priority of the priority indication information carried by the first control information and the priority configured by the RRC signaling.

In an embodiment, in a case where the first control information is used for deactivating one semi-persistent transmission, and the one semi-persistent transmission is configured with a priority by RRC signaling, in response to the first control information not carrying priority indication information, the priority of the one semi-persistent transmission is determined according to the priority configured by the RRC signaling.

In a case where the first control information is used for deactivating one semi-persistent transmission, and the one semi-persistent transmission is not configured with a priority by RRC signaling, in response to the first control information not carrying priority indication information, the priority of the one semi-persistent transmission is determined according to a high priority or a low priority.

In a case where the first control information is used for deactivating one semi-persistent transmission, and the one semi-persistent transmission is configured with a priority by RRC signaling, in response to the first control information carrying priority indication information, the priority of the one semi-persistent transmission is determined according to the priority indication information carried by the first control information.

In a case where the first control information is used for deactivating one semi-persistent transmission, and the one semi-persistent transmission is not configured with a priority by RRC signaling, in response to the first control information carrying priority indication information, the priority of the one semi-persistent transmission is determined according to the priority indication information carried by the first control information.

In a case where the first control information is used for deactivating one semi-persistent transmission, and the one semi-persistent transmission is configured with a priority by RRC signaling, in response to the first control information carrying priority indication information, the priority of the one semi-persistent transmission is determined according to a relatively high priority or a relatively low priority of the priority indication information carried by the first control information and the priority configured by the RRC signaling.

FIG. 7 illustrates a structural diagram of another data processing apparatus according to an embodiment. The data processing apparatus may be configured in a first communication node.

As shown in FIG. 7, the data processing apparatus includes: a processing module 30 and a sending module 31.

The processing module 30 is configured to configure second control information.

The sending module 31 is configured to send the second control information to a second communication node.

The second control information includes: information for indicating that a state of a secondary cell serving the second communication node converts; and the second control information further includes at least one of following pieces of information: information for indicating that the second control information is not used for scheduling user data, information for determining a hybrid automatic repeat request-acknowledgement (HARQ-ACK) information resource of the second control information, information for determining an interval timing from a slot where the second control information is located to a slot where HARQ-ACK of the second control information is located, information for determining an interval timing from a subslot where the second control information is located to a subslot where HARQ-ACK of the second control information is located, information for determining the location of HARQ-ACK of the second control information in a dynamic HARQ-ACK codebook, information of the priority of HARQ-ACK of the second control information, or information for determining the location of HARQ-ACK of the second control information in a semi-persistent HARQ-ACK codebook.

The data processing apparatus provided in the embodiment may implement the data processing method of the preceding embodiments. The data processing apparatus provided in the embodiment has the same implementation principles and technical effects as the preceding embodiments, which are not repeated here.

In an embodiment, the second control information sets or re-interprets part of bit fields in a format of downlink control information (DCI) of downlink scheduling data by using the format of the DCI, or sets or re-interprets part of bit fields in a format of DCI of uplink scheduling data by using the format of the DCI.

In an embodiment, in a case where the second control information sets or re-interprets the part of the bit fields in the format of the DCI of the downlink scheduling data by using the format of the DCI, at least one of definitions described below is included.

A physical uplink control channel (PUCCH) resource indication domain in the DCI is reused.

A physical downlink shared channel (PDSCH)-to-HARQ-ACK timing feedback domain in the DCI is re-interpreted as the interval timing from the slot where the second control information is located to the slot where the HARQ-ACK of the second control information is located.

A PDSCH-to-HARQ-ACK timing feedback domain in the DCI is re-interpreted as the interval timing from the subslot where the second control information is located to the subslot where the HARQ-ACK of the second control information is located.

A downlink assignment index (DAI) domain in the DCI is re-interpreted as for determining the location of the HARQ-ACK of the second control information in the dynamic HARQ-ACK codebook.

A PDSCH time domain resource allocation domain in the DCI is re-interpreted as for determining the location of the HARQ-ACK of the second control information in the semi-persistent HARQ-ACK codebook.

A PDSCH frequency domain resource allocation domain in the DCI is set as an agreed value, where the agreed value is used for representing that a bit field in the format of the DCI of the downlink scheduling data is used as the second control information.

One bit field in the DCI is re-interpreted as for determining the priority of the HARQ-ACK of the second control information, where the one bit field does not include a PUCCH resource indication domain, a PDSCH-to-HARQ-ACK timing feedback domain, a DAI domain, a PDSCH time domain resource allocation domain and a PDSCH frequency domain resource allocation domain.

In an embodiment, in a case where the second control information sets or re-interprets the part of the bit fields in the format of the DCI of the uplink scheduling data by using the format of the DCI, at least one of definitions described below is included.

The first bit filed in the DCI is re-interpreted as a PUCCH resource indication domain.

The second bit field in the DCI is re-interpreted as the interval timing from the slot where the second control information is located to the slot where the HARQ-ACK of the second control information is located.

The second bit field in the DCI is re-interpreted as the interval timing from the subslot where the second control information is located to the subslot where the HARQ-ACK of the second control information is located.

The third bit field in the DCI is re-interpreted as a counter-DAI domain for determining the location of the HARQ-ACK of the second control information in the dynamic HARQ-ACK codebook.

The fourth bit field in the DCI is re-interpreted as a PDSCH time domain resource allocation domain for determining the location of the HARQ-ACK of the second control information in the semi-persistent HARQ-ACK codebook.

A PUSCH time-frequency resource allocation domain in the DCI is re-interpreted as a time-frequency resource domain for allocating the HARQ-ACK of the second control information.

One bit field in the DCI is re-interpreted as for determining the priority of the HARQ-ACK of the second control information, where the one bit field does not include the first bit field, the second bit field, the third bit field, the fourth bit filed and a PUSCH time-frequency resource allocation domain.

In an embodiment, in a case where the second control information is used for indicating that states of at least two secondary cells serving the second communication node convert, the HARQ-ACK of the second control information is counted in HARQ-ACK of a serving cell sending the second control information.

In a case where the second control information is used for indicating that states of at least two secondary cells serving the second communication node convert, the HARQ-ACK of the second control information is counted in HARQ-ACK of a serving cell having the smallest index or the largest index of serving cells states of which convert indicated by the second control information.

In a case where the second control information is used for indicating that states of at least two secondary cells serving the second communication node convert, the HARQ-ACK of the second control information is associated with one serving cell, where the one serving cell is a serving cell indicated by the second control information for association.

In an embodiment, in a case where the HARQ-ACK of the second control information is in combination with the semi-persistent HARQ-ACK codebook, the processing module 30 determines a PDSCH from an associated serving cell, and determines the location of the HARQ-ACK of the second control information in the semi-persistent HARQ-ACK codebook by using the receiving location of the PDSCH.

FIG. 8 illustrates a structural diagram of another data processing apparatus according to an embodiment. The data processing apparatus may be configured in a second communication node. As shown in FIG. 8, the data processing apparatus includes: a reception module 40.

The reception module 40 is configured to receive second control information sent by a first communication node.

The second control information includes: information for indicating that a state of a secondary cell serving the second communication node converts; and the second control information further includes at least one of following pieces of information: information for indicating that the second control information is not used for scheduling user data, information for determining a hybrid automatic repeat request-acknowledgement (HARQ-ACK) information resource of the second control information, information for determining an interval timing from a slot where the second control information is located to a slot where HARQ-ACK of the second control information is located, information for determining an interval timing from a subslot where the second control information is located to a subslot where HARQ-ACK of the second control information is located, information for determining the location of HARQ-ACK of the second control information in a dynamic HARQ-ACK codebook, information of the priority of HARQ-ACK of the second control information, or information for determining the location of HARQ-ACK of the second control information in a semi-persistent HARQ-ACK codebook.

The data processing apparatus provided in the embodiment may implement the data processing method of the preceding embodiments. The data processing apparatus provided in the embodiment has the same implementation principles and technical effects as the preceding embodiments, which are not repeated here.

In an embodiment, the second control information sets or re-interprets part of bit fields in a format of downlink control information (DCI) of downlink scheduling data by using the format of the DCI, or sets or re-interprets part of bit fields in a format of DCI of uplink scheduling data by using the format of the DCI.

In an embodiment, in a case where the second control information sets or re-interprets the part of the bit fields in the format of the DCI of the downlink scheduling data by using the format of the DCI, at least one of definitions described below is included.

A physical uplink control channel (PUCCH) resource indication domain in the DCI is reused.

A physical downlink shared channel (PDSCH)-to-HARQ-ACK timing feedback domain in the DCI is re-interpreted as the interval timing from the slot where the second control information is located to the slot where the HARQ-ACK of the second control information is located.

A PDSCH-to-HARQ-ACK timing feedback domain in the DCI is re-interpreted as the interval timing from the subslot where the second control information is located to the subslot where the HARQ-ACK of the second control information is located.

A downlink assignment index (DAI) domain in the DCI is re-interpreted as for determining the location of the HARQ-ACK of the second control information in the dynamic HARQ-ACK codebook.

A PDSCH time domain resource allocation domain in the DCI is re-interpreted as for determining the location of the HARQ-ACK of the second control information in the semi-persistent HARQ-ACK codebook.

A PDSCH frequency domain resource allocation domain in the DCI is set as an agreed value, where the agreed value is used for representing that a bit field in the format of the DCI of the downlink scheduling data is used as the second control information.

One bit field in the DCI is re-interpreted as for determining the priority of the HARQ-ACK of the second control information, where the one bit field does not include a PUCCH resource indication domain, a PDSCH-to-HARQ-ACK timing feedback domain, a DAI domain, a PDSCH time domain resource allocation domain and a PDSCH frequency domain resource allocation domain.

In an embodiment, in a case where the second control information sets or re-interprets the part of the bit fields in the format of the DCI of the uplink scheduling data by using the format of the DCI, at least one of definitions described below is included.

The first bit filed in the DCI is re-interpreted as a PUCCH resource indication domain.

The second bit field in the DCI is re-interpreted as the interval timing from the slot where the second control information is located to the slot where the HARQ-ACK of the second control information is located.

The second bit field in the DCI is re-interpreted as the interval timing from the subslot where the second control information is located to the subslot where the HARQ-ACK of the second control information is located.

The third bit field in the DCI is re-interpreted as a counter-DAI domain for determining the location of the HARQ-ACK of the second control information in the dynamic HARQ-ACK codebook.

The fourth bit field in the DCI is re-interpreted as a PDSCH time domain resource allocation domain for determining the location of the HARQ-ACK of the second control information in the semi-persistent HARQ-ACK codebook.

A PUSCH time-frequency resource allocation domain in the DCI is re-interpreted as a time-frequency resource domain for allocating the HARQ-ACK of the second control information.

One bit field in the DCI is re-interpreted as for determining the priority of the HARQ-ACK of the second control information, where the one bit field does not include the first bit field, the second bit field, the third bit field, the fourth bit filed and a PUSCH time-frequency resource allocation domain.

In an embodiment, in a case where the second control information is used for indicating that states of at least two secondary cells serving the second communication node convert, the HARQ-ACK of the second control information is counted in HARQ-ACK of a serving cell sending the second control information.

In a case where the second control information is used for indicating that states of at least two secondary cells serving the second communication node convert, the HARQ-ACK of the second control information is counted in HARQ-ACK of a serving cell having the smallest index or the largest index of serving cells states of which convert indicated by the second control information.

In a case where the second control information is used for indicating that states of at least two secondary cells serving the second communication node convert, the HARQ-ACK of the second control information is associated with one serving cell, where the one serving cell is a serving cell indicated by the second control information for association.

In an embodiment, in a case where the HARQ-ACK of the second control information is in combination with the semi-persistent HARQ-ACK codebook, the receiving location of a PDSCH determined from an associated serving cell is used for determining the location of the HARQ-ACK of the second control information in the semi-persistent HARQ-ACK codebook.

An embodiment of the present application further provides a communication node. The communication node includes a processor, which is configured to, when executing a computer program, implement the method provided in any embodiment of the present application. Specifically, the communication node may be the first communication node provided in any embodiment of the present application, or may be the second communication node provided in any embodiment of the present application, which is not specifically limited in the present application.

Exemplarily, embodiments described below provide structural diagrams of a communication node being a UE and a base station.

Figure 9:
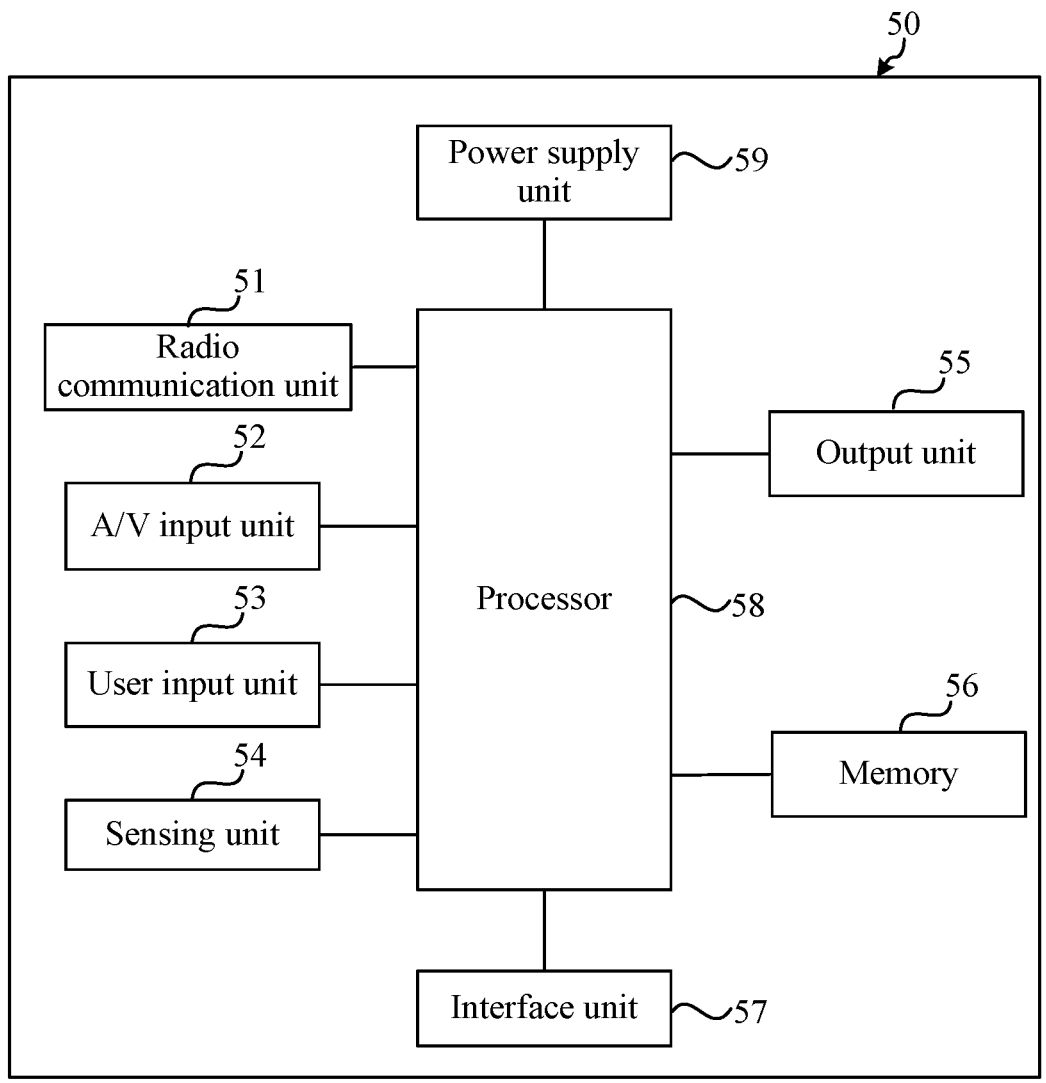
FIG. 9 is a structural diagram of a UE according to an embodiment.

FIG. 9 illustrates a structural diagram of a UE according to an embodiment. The UE may be implemented in multiple forms. The UE in the present application may include, but is not limited to, mobile terminal devices such as a mobile phone, a smart phone, a notebook computer, a digital broadcast receiver, a personal digital assistant (PDA), a portable device (PAD), a portable multimedia player (PMP), a navigation apparatus, a vehicle-mounted terminal device, a vehicle-mounted display terminal and a vehicle-mounted electronic rearview mirror and fixed terminal devices such as a digital television (TV) and a desktop computer.

As shown in FIG. 9, the UE 50 may include a radio communication unit 51, an audio/video (A/V) input unit 52, a user input unit 53, a sensing unit 54, an output unit 55, a memory 56, an interface unit 57, a processor 58 and a power supply unit 59. FIG. 9 illustrates the UE including multiple assemblies; but it is to be noted that it is not required to implement all the illustrated assemblies, and more or fewer assemblies may be implemented instead.

In the embodiment, the radio communication unit 51 allows radio communication between the UE 50 and a base station or a network. The A/V input unit 52 is configured to receive audio or video signals. The user input unit 53 may generate key input data according to commands input by a user to control various operations of the UE 50. The sensing unit 54 detects, for example, the current state of the UE 50, the location of the UE 50, the presence or absence of the user's touch input to the UE 50, the orientation of the UE 50, and the movement and direction of the acceleration or deceleration of the UE 50, and generates commands or signals for controlling the operations of the UE 50. The interface unit 57 serves as an interface through which at least one external apparatus can be connected to the UE 50. The output unit 55 is configured to provide output signals in a visual, audio, and/or tactile manner. The memory 56 may store, for example, a software program for processing and controlling an operation executed by the processor 58 or may temporarily store data that has been output or is to be output. The memory 56 may include at least one type of storage medium. Moreover, the UE 50 may cooperate with a network storage apparatus that performs the storage function of the memory 56 through network connection. The processor 58 is generally configured to control the overall operation of the UE 50. The power supply unit 59 receives external power or internal power under the control of the processor 58 and provides appropriate power required for operating various elements and assemblies.

The processor 58 runs programs stored in the memory 56 to execute at least one function application and data processing, for example, to implement the method provided in the embodiments of the present application.

Figure 10:
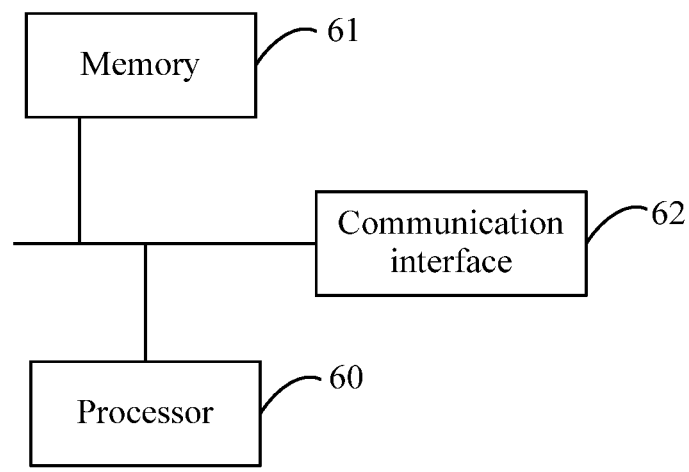
FIG. 10 is a structural diagram of a base station according to an embodiment.

FIG. 10 illustrates a structural diagram of a base station according to an embodiment. As shown in FIG. 10, the base station includes a processor 60, a memory 61 and a communication interface 62. One or more processors 60 may be provided in the base station, and one processor 60 is used as an example in FIG. 10. The processor 60, the memory 61 and the communication interface 62 that are in the base station may be connected through a bus or in other manners. In FIG. 10, the connection through a bus is used as an example. The bus represents one or more of several types of bus structures, including a memory bus or a memory controller, a peripheral bus, an accelerated graphics port, a processor, or a local bus using any bus structure among multiple bus structures.

As a computer-readable storage medium, the memory 61 may be configured to store software programs, computer-executable programs and modules, such as program instructions/modules corresponding to the method in the embodiments of the present application. The processor 60 runs software programs, instructions and modules stored in the memory 61 to execute at least one function application and data processing of the base station, that is, to implement the preceding data processing method.

The memory 61 may include a program storage region and a data storage region. The program storage region may store an operating system and an application program required by at least one function; and the data storage region may store data created depending on the use of a terminal. Additionally, the memory 61 may include a high-speed random-access memory and may further include a non-volatile memory, for example, at least one magnetic disk memory element, flash memory element, or another non-volatile solid-state memory element. In some examples, the memory 61 may include memories that are remotely disposed with respect to the processor 60.

These remote memories may be connected to the base station via a network. Examples of the preceding network include, but are not limited to, the Internet, an intranet, a network, a mobile communication network and combinations thereof.

The communication interface 62 may be configured to receive and send data.

An embodiment of the present application further provides a computer-readable storage medium. The computer-readable storage medium is configured to store computer programs which, when executed by a processor, implement the method provided in any embodiment of the present application.

The computer storage medium in the embodiment of the present application may use any combination of one or more computer-readable media. The computer-readable medium may be a computer-readable signal medium or a computer-readable storage medium. The computer-readable storage medium may be, but is not limited to, an electrical, magnetic, optical, electromagnetic, infrared, or semiconductor system, apparatus, or element, or any combination thereof. The computer-readable storage medium includes (a non-exhaustive list): an electrical connection having one or more wires, a portable computer disk, a hard disk, a random-access memory (RAM), a read-only memory (ROM), an electrically erasable programmable read-only memory (EPROM), a flash memory, an optical fiber, a portable compact disc read-only memory (CD-ROM), an optical memory element, a magnetic memory element, or any suitable combination thereof. In the present application, the computer-readable storage medium may be any tangible medium including or storing a program. The program may be used by or used in conjunction with an instruction execution system, apparatus or element.

The computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may further be any computer-readable medium other than a computer-readable storage medium. The computer-readable medium may send, propagate or transmit the program used by or used in conjunction with an instruction execution system, apparatus or element.

The program codes included on the computer-readable medium may be transmitted by using any suitable medium including, but not limited to, a radio medium, a wire, an optical cable, radio frequency (RF), or any suitable combination thereof.

Computer program codes for performing the operations of the present disclosure may be written in one or more programming languages or a combination of multiple programming languages. The programming languages include object-oriented programming languages such as Java, Smalltalk, C++, Ruby, and Go and conventional procedural programming languages such as C language or similar programming languages. The program codes may be executed entirely on a user computer, partly on a user computer, as a stand-alone software package, partly on a user computer and partly on a remote computer, or entirely on a remote computer or a server. In the case related to a remote computer, the remote computer may be connected to a user computer via any type of network including a local area network (LAN) or a wide area network (WAN) or may be connected to an external computer (for example, via the Internet through an Internet service provider).

It is to be understood by those skilled in the art that the term "user terminal" covers any suitable type of radio user equipment, for example, a mobile phone, a portable data processing apparatus, a portable web browser or a vehicle-mounted mobile station.

In general, multiple embodiments of the present application may be implemented in hardware, a special-purpose circuit, software, logic or any combination thereof. For example, some aspects may be implemented in hardware while other aspects may be implemented in firmware or software that may be performed by a controller, a microprocessor or other computing apparatuses, though the present application is not limited thereto.

The embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable to the local technical environment and may be implemented using any suitable data storage technology, such as, but not limited to, a read-only memory (ROM), a random-access memory (RAM), an optical storage apparatus and system (a digital video disc (DVD) or a compact disc (CD)), and the like. Computer-readable media may include non-transitory storage media. The data processor may be of any type suitable to the local technical environment, such as, but not limited to, a general-purpose computer, a special-purpose computer, a microprocessor, a digital signal processor (DSP), an application specific integrated circuit (ASIC), a field-programmable gate array (FPGA) and a processor based on a multi-core processor architecture.

What is claimed is:

1. A data processing method, comprising:
   sending, by a first communication node to a second communication node, first control information that is used for deactivating at least two semi-persistent transmissions having a same priority, the at least two semi-persistent transmissions including a first semi-persistent transmission that is a semi-persistent scheduling physical downlink shared channel (SPS PDSCH) that allows, after activation, data reception at periodic, and
   wherein a location of hybrid automatic repeat request-acknowledgement (HARQ-ACK) associated with the first control information in a semi-persistent HARQ-ACK codebook is same as a receiving location of a physical downlink shared channel (PDSCH) of the first semi-persistent transmission
   having a smallest index among indexes of the at least two semi-persistent transmissions,
   wherein in response to the at least two semi-persistent transmissions not being configured with priorities by a radio resource control (RRC) signaling, the HARQ-ACK of the first control information is determined as a low priority.

2. The data processing method according to claim 1, wherein in a case that at least two semi-persistent transmissions including the first semi-persistent transmission and a second semi-persistent transmission have different priorities, the first communication node configures an index value of the first semi-persistent transmission with a higher priority than that of the second semi-persistent transmission to be smaller than an index value of the second semi-persistent transmission, or the first communication node configures an index value of the first semi-persistent transmission to be larger than an index value of the second semi-persistent transmission.

3. The data processing method according to claim 1, wherein a priority of the HARQ-ACK associated with the first control information is determined to be
   a priority of a semi-persistent transmission configured by radio resource control (RRC) signaling of the at least two deactivated semi-persistent transmissions.

4. The data processing method according to claim 1, wherein the first control information is associated with the first semi-persistent transmission.

5. A data processing method, comprising:
   receiving, by a second communication node from a first communication node, first control information that is used for deactivating at least two semi-persistent transmissions having a same priority, the at least two semi-persistent transmissions including a first semi-persistent transmission that is a semi-persistent scheduling physical downlink shared channel (SPS PDSCH) that allows, after activation, data reception at periodic, and
   wherein a location of hybrid automatic repeat request-acknowledgement (HARQ-ACK) associated with the first control information in a semi-persistent HARQ-ACK codebook is same as a receiving location of a physical downlink shared channel (PDSCH) of the first semi-persistent transmission
   having a smallest index among indexes of the at least two semi-persistent transmissions,
   wherein in response to the at least two semi-persistent transmissions not being configured with priorities by a radio resource control (RRC) signaling, the HARQ-ACK of the first control information is determined as a low priority.

6. The data processing method according to claim 5, wherein the first control information is associated with the first semi-persistent transmission.

7. The data processing method according to claim 5, wherein in a case that at least two semi-persistent transmissions including the first semi-persistent transmission and a second semi-persistent transmission have different priorities, the first communication node configures an index value of the first semi-persistent transmission with a higher priority than that of the second semi-persistent transmission to be smaller than an index value of the second semi-persistent transmission, or the first communication node configures an index value of the first semi-persistent transmission to be larger than an index value of the second semi-persistent transmission.

8. The data processing method according to claim 5, wherein a priority of the HARQ-ACK associated with the first control information is determined to be a priority of a semi-persistent transmission configured by radio resource control (RRC) signaling of the at least two deactivated semi-persistent transmissions.

9. A communication apparatus comprising a processor configured to implement a method comprising:
   sending, by a first communication node to a second communication node, first control information that is used for deactivating at least two semi-persistent transmissions having a same priority, the at least two semi-persistent transmissions including a first semi-persistent transmission that is a semi-persistent scheduling physical downlink shared channel (SPS PDSCH) that allows, after activation, data reception at periodic, and
   wherein a location of hybrid automatic repeat request-acknowledgement (HARQ-ACK) associated with the first control information in a semi-persistent HARQ-ACK codebook is same as a receiving location of a physical downlink shared channel (PDSCH) of the first semi-persistent transmission
   having a smallest index among indexes of the at least two semi-persistent transmissions,
   wherein in response to the at least two semi-persistent transmissions not being configured with priorities by a radio resource control (RRC) signaling, the HARQ-ACK of the first control information is determined as a low priority.

10. The communication apparatus according to claim 9, wherein the first control information is associated with the first semi-persistent transmission.

11. The communication apparatus according to claim 9, wherein in a case that at least two semi-persistent transmissions including the first semi-persistent transmission and a second semi-persistent transmission have different priorities, the first communication node configures an index value of the first semi-persistent transmission with a higher priority than that of the second semi-persistent transmission to be smaller than an index value of the second semi-persistent transmission, or the first communication node configures an index value of the first semi-persistent transmission to be larger than an index value of the second semi-persistent transmission.

12. The communication apparatus according to claim 9, wherein a priority of the HARQ-ACK associated with the first control information is determined to be a priority of a semi-persistent transmission configured by radio resource control (RRC) signaling of the at least two deactivated semi-persistent transmissions.

13. A communication apparatus comprising a processor configured to implement a method comprising:
   receiving, by a second communication node from a first communication node, first control information that is used for deactivating at least two semi-persistent transmissions having a same priority, the at least two semi-persistent transmissions including a first semi-persistent transmission that is a semi-persistent scheduling physical downlink shared channel (SPS PDSCH) that allows, after activation, data reception at periodic, and
   wherein a location of hybrid automatic repeat request-acknowledgement (HARQ-ACK) corresponding to the first control information in a semi-persistent HARQ-ACK codebook is same as a receiving location of a physical downlink shared channel (PDSCH) of the first semi-persistent transmission
   having a smallest index among indexes of the at least two semi-persistent transmissions,
   wherein in response to the at least two semi-persistent transmissions not being configured with priorities by a radio resource control (RRC) signaling, the HARQ-ACK of the first control information is determined as a low priority.

14. The communication apparatus according to claim 13, wherein the first control information is associated with the first semi-persistent transmission.

15. The communication apparatus according to claim 13, wherein in a case that at least two semi-persistent transmissions including the first semi-persistent transmission and a second semi-persistent transmission have different priorities, the first communication node configures an index value of the first semi-persistent transmission with a higher priority than that of the second semi-persistent transmission to be smaller than an index value of the second semi-persistent transmission, or the first communication node configures an index value of the first semi-persistent transmission to be larger than an index value of the second semi-persistent transmission.

16. The communication apparatus according to claim 13, wherein a priority of the HARQ-ACK associated with the first control information is determined to be a priority of a semi-persistent transmission configured by radio resource control (RRC) signaling of the at least two deactivated semi-persistent transmissions.

* * * * *